United States Patent
Murayama

(10) Patent No.: US 6,618,205 B2
(45) Date of Patent: Sep. 9, 2003

(54) ENDOSCOPE OBJECTIVE OPTICAL SYSTEM

(75) Inventor: Minoru Murayama, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/142,775

(22) Filed: May 13, 2002

(65) Prior Publication Data

US 2003/0030918 A1 Feb. 13, 2003

(30) Foreign Application Priority Data

May 14, 2001 (JP) ........................... 2001-143531

(51) Int. Cl.[7] ............... G02B 25/00; G02B 15/14; G02B 13/04
(52) U.S. Cl. ................. 359/645; 359/682; 359/753
(58) Field of Search ..................... 359/644, 645, 359/646, 659, 660, 661, 680, 681, 682, 689, 753, 784, 793, 676

(56) References Cited

U.S. PATENT DOCUMENTS

| | | | |
|---|---|---|---|
| 4,042,295 A | 8/1977 | Yamasita et al. | 359/735 |
| 4,976,522 A | 12/1990 | Igarashi | 359/680 |
| 5,748,385 A | 5/1998 | Miyano | 359/691 |
| 6,252,723 B1 | 6/2001 | Nagaoka | 359/689 |
| 6,353,504 B1 * | 3/2002 | Yamamoto | 359/686 |
| 6,383,131 B1 * | 5/2002 | Yamamoto et al. | 600/111 |
| 6,400,514 B2 * | 6/2002 | Minami et al. | 359/660 |

FOREIGN PATENT DOCUMENTS

| | | | |
|---|---|---|---|
| JP | 55-15004 | 4/1980 | |
| JP | 8-54561 | 2/1996 | |
| JP | 2804267 | 7/1998 | |
| JP | 11316339 | 11/1999 | |
| JP | 2000267002 A * | 9/2000 | G02B/15/14 |
| JP | 2000330020 A * | 11/2000 | G02B/15/15 |
| JP | 2000330024 A * | 11/2000 | G02B/15/16 |

* cited by examiner

Primary Examiner—Evelyn Lester
Assistant Examiner—Jack Dinh
(74) Attorney, Agent, or Firm—Greenblum & Bernstein, P.L.C.

(57) ABSTRACT

An endoscope objective optical system includes a negative first lens group, a positive second lens group, and an imaging device, in this order from the object. Zooming is performed by moving the positive second lens group in the optical axis direction, and the endoscope objective optical system satisfies the following condition:

$$m_{2T} < m_{2W} < -1 \quad (1)$$

wherein
 $m_{2T}$ designates the lateral magnification of the second lens group at the long focal length extremity, and
 $m_{2W}$ designates the lateral magnification of the second lens group at the short focal length extremity.

9 Claims, 23 Drawing Sheets

| 1:5.7 | 1:5.7 | Y=1.37 | Y=1.37 | Y=1.37 |

— SA
-- SC

— d Line
····· g Line
---- C Line

— S
-- M

-0.1  0.1    -0.1  0.1    -0.01  0.01    -0.20  0.20    -50 (%) 50
Spherical    Spherical    Lateral         Astigmatism   Distortion
Aberration   Aberration   Chromatic
                          Aberration
The Sine     Chromatic
Condition    Aberration

ENDOSCOPE OBJECTIVE OPTICAL SYSTEM

BACKGROUND OF THE INVENTION

1. Field of the Invention

The present invention relates to an objective optical system of an electronic endoscope.

2. Description of the Prior Art

As conventional objective optical systems of endoscopes, in which (i) a retrofocus-type optical system including a negative first lens group and a positive second lens group has been employed, and (ii) the positive second lens group is arranged to move in the optical axis direction to perform zooming, there have been ones as disclosed in, e.g., Japanese Unexamined Patent Publication (JUPP) No. Sho-51-44937, and JUPP No. Hei-1-279219. However, the objective optical system disclosed in JUPP No. Sho-51-44937 is provided with a small zoom ratio, and with a narrow angle of field of about 90° at the short focal length extremity. Furthermore, the objective optical system disclosed in JUPP No. Hei-1-279219 is also provided with a narrow angle of field of about 100° at the short focal length extremity.

As examples of objective optical systems of endoscopes provided with a super wide-angle at the short focal length extremity, JUPP No. Hei-8-54561 and JUPP Hei-11-316339 have disclosed objective optical systems having an angle of field of about 130° through 140° at the short focal length extremity.

In the objective optical system of an endoscope disclosed in JUPP No. Hei-8-54561, a real-image is formed at an intermediate position in the optical system, and zooming is performed by a relay optical system. Consequently, the number of lens elements of the objective optical system is large, and the overall length thereof is long.

In the objective optical system of an endoscope disclosed in JUPP Hei-11-316339, the objective optical system includes the three-lens-group arrangement, i.e., a positive lens group, a negative lens group and a positive lens group; and the second lens group is moved in order to perform zooming. However, the arrangement of the positive first lens group is equivalent to the retrofocus optical system in which the most object-side lens element thereof has negative power for the purpose of attaining a wide angle-of-view. Consequently, the number of lens elements of the objective optical system is large, and the overall length thereof is long. Moreover, zooming is performed by the negative second lens group, so that the diameter of the third lens group becomes larger, if an attempt is made to have a shorter focal length at the short focal length extremity.

SUMMARY OF THE INVENTION

The present invention is applied to the objective optical system of an endoscope, in which a negative first lens group and a positive second lens group are provided, and zooming is performed by moving the positive second lens group in the optical axis direction. More specifically, according to the present invention, by setting the lateral magnification within a predetermined range, the objective optical system of an endoscope can enable both observing at a wider angle of field, and enlarged observing at a higher zoom ratio, while the overall length of the objective optical system is maintained shorter, and the diameter thereof is maintained smaller.

According to the present invention, there is provided an objective optical system of an endoscope (hereinafter, the endoscope objective optical system) including a negative first lens group, a positive second lens group, and an imaging device, in this order from the object. A focal length of the entire endoscope objective optical system is changed by moving the positive second lens group in the optical axis direction, and the endoscope objective optical system satisfies the following condition:

$$m_{2T} < m_{2W} < -1 \tag{1}$$

wherein $m_{2T}$ designates the lateral magnification of the second lens group at the long focal length extremity, and $m_{2W}$ designates the lateral magnification of the second lens group at the short focal length extremity.

The endoscope objective optical system can satisfy the following condition:

$$-1.15 < f_1/f_W < -0.5 \tag{2}$$

wherein $f_1$ designates the focal length of the first lens group, and $f_W$ designates the focal length of the entire endoscope objective optical system at the short focal length extremity.

More concretely, the negative first lens group of the endoscope objective optical system is fixed to the front-end of the endoscope body-insertion portion, and the positive second lens group and the imaging device are supported in the endoscope body-insertion portion in a manner that these are moveable in the optical axis direction. Furthermore, the positive second lens group is moved in order to vary the focal length of the entire endoscope objective optical system, and the imaging device is arranged to move along the optical axis in order to vary the magnification of the endoscope objective optical system, and vary a object distance, which is a distance from the most object-side surface of the objective optical system to an object in an in-focus state.

The negative first lens group can include a negative lens element, or alternatively, includes a negative lens element and a positive lens element, in this order from the object. Specifically, in the case where the negative first lens group includes the two lens elements, the negative first lens group preferably satisfies the following conditions:

$$n_- > 1.7 \tag{3}$$

$$3.5 < f_{1+}/f_W < 25 \tag{4}$$

wherein $n_-$ designates the refractive index of the negative lens element in the negative first lens group, and $f_{1+}$ designates the focal length of the positive lens element in the negative first lens group.

Furthermore, the endoscope objective optical system preferably satisfies the following conditions:

$$-9.2 < ODIS\_w/f_W < -4.7 \tag{5}$$

$$-2.2 < ODIS\_t/f_W < -0.8 \tag{6}$$

wherein

ODIS_w_ designates the object distance (a distance from the most object-side surface of the first lens group to an object in an in-focus state) at the short focal length extremity;

ODIS_t designates the object distance at the long focal length extremity; and fw designates the focal length of the entire endoscope objective optical system.

The negative first lens group can include a negative lens element having at least one aspherical surface. From the aspect of the correcting of aberrations, the aspherical surface is preferably formed so that the lens thickness of the negative lens element having the aspherical surface is lager than that of a negative lens element having a spherical surface with the same paraxial radius of curvature as the paraxial radius of curvature of the aspherical surface at the same height from the optical axis, and the difference between the thickness of the negative lens element having the aspherical surface and the negative lens element having the spherical surface increases as the height from the optical axis increases.

Alternatively, in the case where the negative first lens group includes a positive lens element, the positive lens element can have at least one aspherical surface. The aspherical surface is formed so that the lens thickness of the positive lens element having the aspherical surface is smaller than that of a positive lens element having a spherical surface with the same paraxial radius of curvature as the paraxial radius of curvature of the aspherical surface at the same height from the optical axis, and the difference between the thickness of the positive lens element having the aspherical surface and the positive lens element having the spherical surface increases as the height from the optical axis increases.

As another alternative, in the case where the positive second lens group includes a positive lens element, the positive lens element can have at least one aspherical surface. The aspherical surface is formed so that the lens thickness of the positive lens element having the aspherical surface is lager than that of a positive lens element having a spherical surface with the same paraxial radius of curvature as the paraxial radius of curvature of the aspherical surface at the same height from the optical axis, and the difference between the thickness of the positive lens element having the aspherical surface and the positive lens element having the spherical surface increases as the height from the optical axis increases.

The present disclosure relates to subject matter contained in Japanese Patent Application No. 2001-143531 (filed on May 14, 2001) which is expressly incorporated herein in its entirety.

BRIEF DESCRIPTION OF THE DRAWINGS

The present invention will be discussed below in detail with reference to the accompanying drawings, in which:

FIGS. 44A, 44B, 44C, 40D and 44E show aberrations occurred in the lens arrangement of FIG. 43;

DESCRIPTION OF THE PREFERRED EMBODIMENTS

Figure 45:
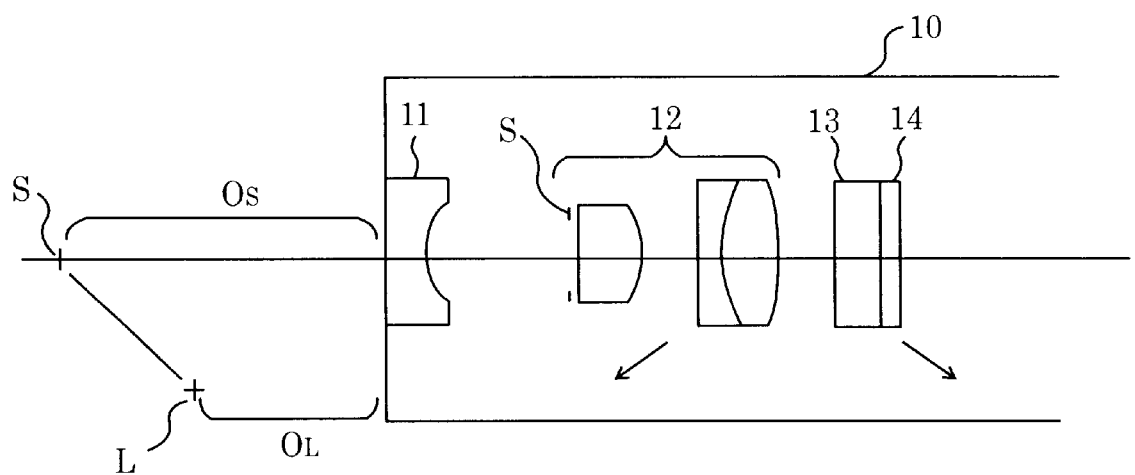
FIG. 45 is a schematic view showing the endoscope objective optical system fixed to the front-end of the endoscope body-insertion portion, and showing a moving path of the endoscope objective optical system.

FIG. 45 shows an embodiment of the endoscope objective optical system. A negative first lens group 11 is fixed to the front-end of an endoscope body-insertion portion 10. In the endoscope body-insertion portion 10, a diaphragm S, a positive second lens group 12, a cover glass (filters) 13, and an imaging device 14 fixed behind the cover glass 13 are provided, in this order from the first lens group 11. The diaphragm S is mounted to the positive second lens group 12. Each of the second lens group 12 (the diaphragm S) and a combined body including the cover glass 13 and the imaging device 14 is moveable in the optical axis direction, respectively.

More specifically, the operation of the endoscope objective optical system to vary its magnification is as follows:

(i) at the short focal length extremity, the second lens group 12 and the imaging device 14 with the cover glass 13 are positioned closest to each other, and an object at an object distance OS is focused on the imaging device 14;

(ii) the second lens group 12 is moved toward the object to vary the focal length on the side of a longer focal length; and (iii) the imaging device 14 (the cover glass 13) is moved away from the object so that an object at a shorter object distance OL is focused on the imaging device.

In the above retrofocus-type endoscope objective optical system including the negative first lens group 11 and the positive second lens group 12, when the positive second lens group 12 is arranged to move in the optical axis direction to vary the focal length of the entire endoscope objective optical system, the distance between the negative first lens group 11 and the positive second lens group 12 at the shortest focal length extremity becomes longer. As a result, the diameter of the negative first lens group 11 tends to be larger than that of an endoscope objective optical system with a fixed focal length, i.e., an endoscope objective optical system without moveable lens groups.

If an attempt is made to attain a shorter focal length at the short focal length extremity while the diameter of the negative first lens group 11 is made smaller, there is a need to increase the power of the negative first lens group 11. Furthermore, if an attempt is made to increase the power of the negative first lens group 11 while the magnification of the entire endoscope objective optical system is maintained constant, there is a need to increase the power of the positive second lens group 12.

Condition (1) specifies the magnification of the positive second lens group 12 in order to achieve a wide angle of field and further miniaturization of the negative first lens group 11.

If $m_{2T} < m_{2W}$ exceeds the upper limit of condition (1), the power of the negative first lens group 11 becomes weaker, so that the diameter of the negative first lens group 11 becomes larger, if an attempt is made to attain a wider angle of field.

Condition (2) specifies the focal length of the negative first lens group 11 in order to attain a wider angle of field under the condition that condition (1) is satisfied.

If the angle of field is made wider to the extent that $f_1/f_W$ exceeds the lower limit of condition (2), the diameter of the negative first lens group 11 becomes large.

If $f_1/f_W$ exceeds the upper limit of condition (2), aberrations largely occur in the negative first lens group 11, so that aberrations in each focal length range cannot be corrected. This is because in the negative fist lens group 11, there is a large difference in the heights of a marginal light ray at the short focal length extremity and the long focal length extremity.

As can be understood from the above description, the negative first lens group 11 has a strong negative power. Accordingly, aberrations occurred therein become larger.

The negative first lens group 11 can be constituted by a single lens element; however, it is preferable that the negative first lens group 11 be constituted by a negative lens element and a positive lens element in order to carry out the correcting of aberrations for the purpose of maintaining optical performance over the entire focal length ranges from the short focal length extremity to the long focal length extremity in a well balanced manner.

According to the 'negative and positive' two lens-element arrangement of the negative first lens group 11, aberrations, such as lateral chromatic aberration and field curvature which occur in the negative first lens group 11 at the short focal length extremity, can be made smaller. Consequently, adequate optical performance, over the entire zooming range from the short focal length extremity to the long focal length extremity, can be achieved.

Condition (3) specifies the refractive index of a negative lens element in the negative first lens group 11 in order to maintain the diameter of the negative first lens group 11 smaller.

Condition (4) specifies the power of a positive lens element in the negative first lens group 11.

If $f_{1-}/f_W$ exceeds the lower limit of condition (4), the negative power of the negative first lens group 11 becomes smaller, so that the diameter of the negative first lens group 11 becomes larger.

If $f_{1-}/f_W$ exceeds the upper limit of condition (4), the effects of the correcting of aberrations by the positive lens element becomes smaller.

It is also effective to utilize an aspherical surface in order to correct aberrations which occur in the negative first lens group 11 having a strong negative power.

As explained, in the negative fist lens group 11, there is a large difference in the heights of a marginal light ray at the short focal length extremity and the long focal length extremity. Accordingly, the aspherical surface of the following features can suitably correct coma and filed curvature at the short focal length extremity and the long focal length extremity:

(a) In the case where the negative first lens group 11 can include a negative lens element having an aspherical surface, the aspherical surface is formed so that the lens thickness of the negative lens element having the aspherical surface is lager than that of a negative lens element having a spherical surface with the same paraxial radius of curvature as the paraxial radius of curvature of the aspherical surface at the same height from the optical axis, and the difference between the thickness of the negative lens element having the aspherical surface and the negative lens element having the spherical surface increases as the height from the optical axis increases.

(b) In the case where the negative first lens group 11 includes a positive lens element having an aspherical surface, the aspherical surface is formed so that the lens thickness of the positive lens element having the aspherical surface is smaller than that of a positive lens element having a spherical surface with the same paraxial radius of curvature as the paraxial radius of curvature of the aspherical surface at the same height from the optical axis, and the difference between the thickness of the positive lens element having the aspherical surface and the positive lens element having the spherical surface increases as the height from the optical axis increases.

Furthermore, in the positive second lens group 12, an aspherical surface is preferably provided on the most image-side surface thereof where the height of a marginal light ray is high. By utilizing such an aspherical surface in the positive second lens group 12, coma and field curvature can be suitably corrected. In particular, it is preferable that the positive second lens group comprise a positive lens element having at least one aspherical surface which is formed so that the lens thickness of the positive lens element having the aspherical surface is lager than that of a positive lens element having a spherical surface with the same paraxial radius of curvature as the paraxial radius of curvature of the aspherical surface at the same height from the optical axis, and the difference between the thickness of the positive lens element having the aspherical surface and the positive lens element having the spherical surface increases as the height from the optical axis increases.

Condition (5) specifies the ratio of the object distance to the focal length of the entire endoscope objective optical system, both of which are at the short focal length extremity.

If ODIS_w/fw exceeds the lower limit of condition (5), the object distance at the short focal length extremity becomes longer, so that it is difficult to determine a portion to be magnified and observed. This is because when the lower limit of condition (5) is exceeded, the near point ((H×D)/(H+D); H: a hyperfocal distance; D: a position of an object in an in-focus state) of the depth of field is far when observation is performed at a wide angle of field.

If ODIS_w/fw exceeds the upper limit of condition (5), the object distance at the short focal length extremity becomes shorter, so that it is difficult to observe an object at a longer distance.

Condition (6) specifies the ration of the object distance at the long focal length extremity to the focal length of the entire endoscope objective optical system at the short focal length extremity.

If ODIS_t/fw exceeds the lower limit of condition (6), an enough enlarging magnification cannot be obtained.

If ODIS_t/fw exceeds the upper limit of condition (6), the front end of the endoscope is positioned too close to a portion to be observed. Accordingly, lighting to the portion may become insufficient, and/or the front end thereof may come into contact with the portion to be observed, which makes an observation impossible even by a slight movement of the endoscope.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FE designates the effective F-number, f designates the focal length of the entire endoscope objective optical system, ODIS designates the object distance which is from the most object-side surface of the first lens group to an object, fB designates the back focal distance (the air-distance between the most image-side surface of the cover glass 13 and the image forming surface of the imaging device 14), m designates the lateral magnification of the entire endoscope objective optical system, m2T designates the lateral magnification of the positive second lens group 12 at the long focal length extremity, which is calculated at the object distance of −2.5, m2W designates the lateral magnification of the positive second lens group 12 at the short focal length extremity, which is calculated at the object distance of −10, r designates the paraxial radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

Figure 1:
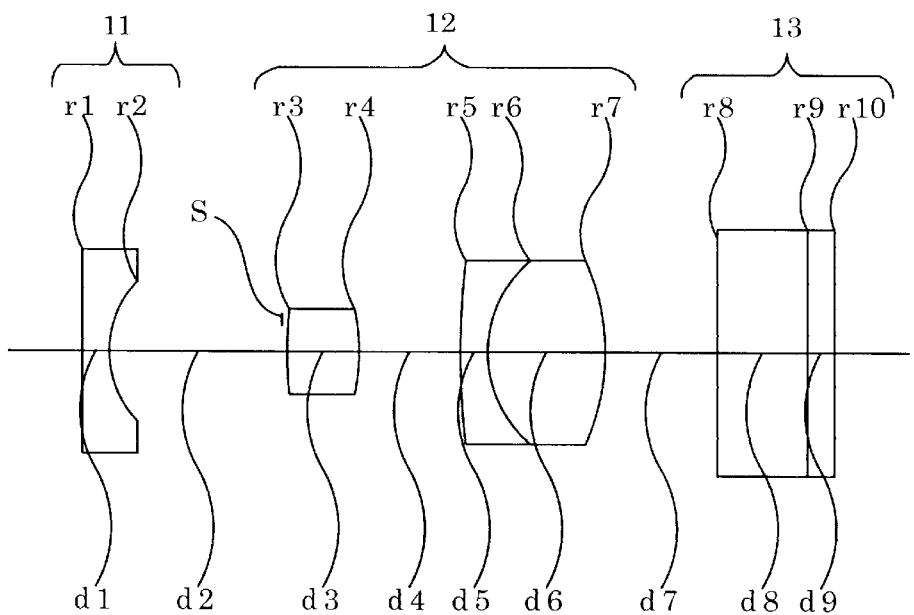
FIG. 1 shows a lens arrangement of an endoscope objective optical system at the short focal length extremity, according to a first embodiment of the present invention.
Figures 2A, 2B, 2C, 2D, 2E:
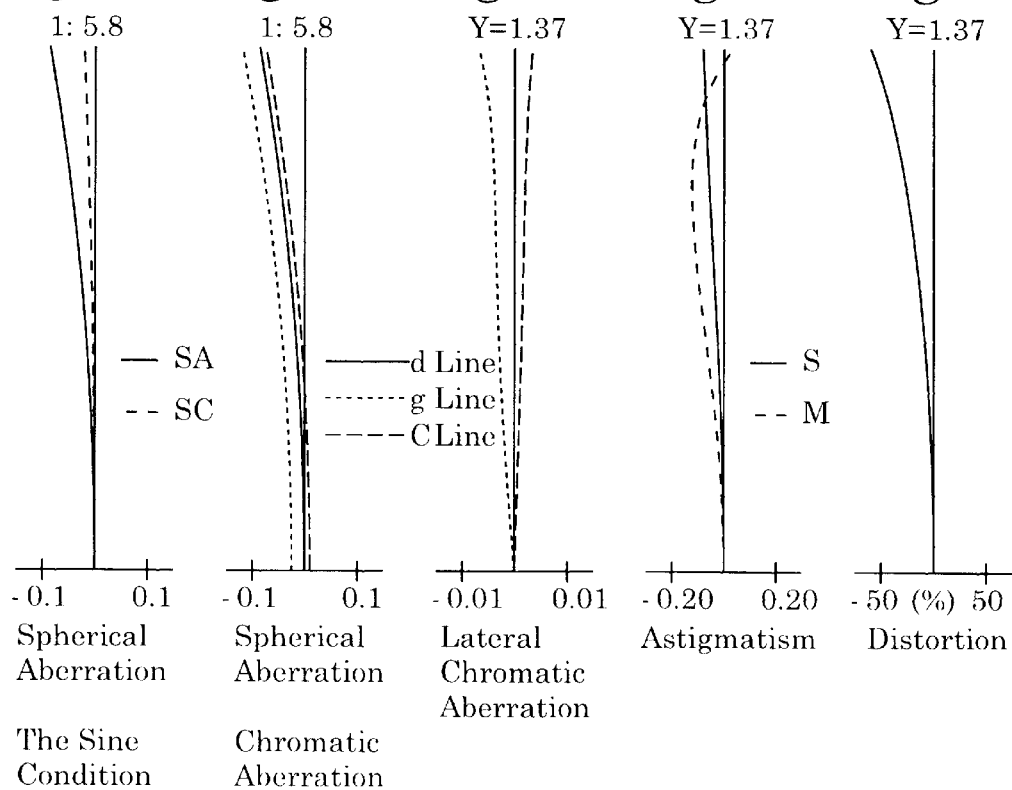
FIGS. 2A, 2B, 2C, 2D and 2E show aberrations occurred in the lens arrangement of FIG. 1.
Figure 3:
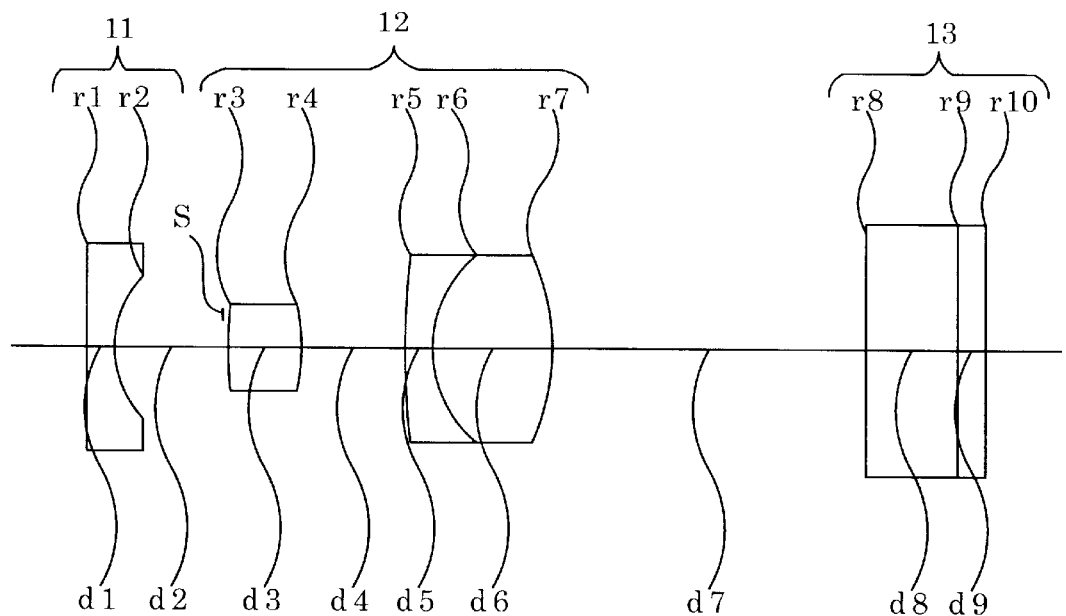
FIG. 3 shows a lens arrangement of the endoscope objective optical system at the long focal length extremity, according to the first embodiment of the present invention.
Figures 4A, 4B, 4C, 4D, 4E:
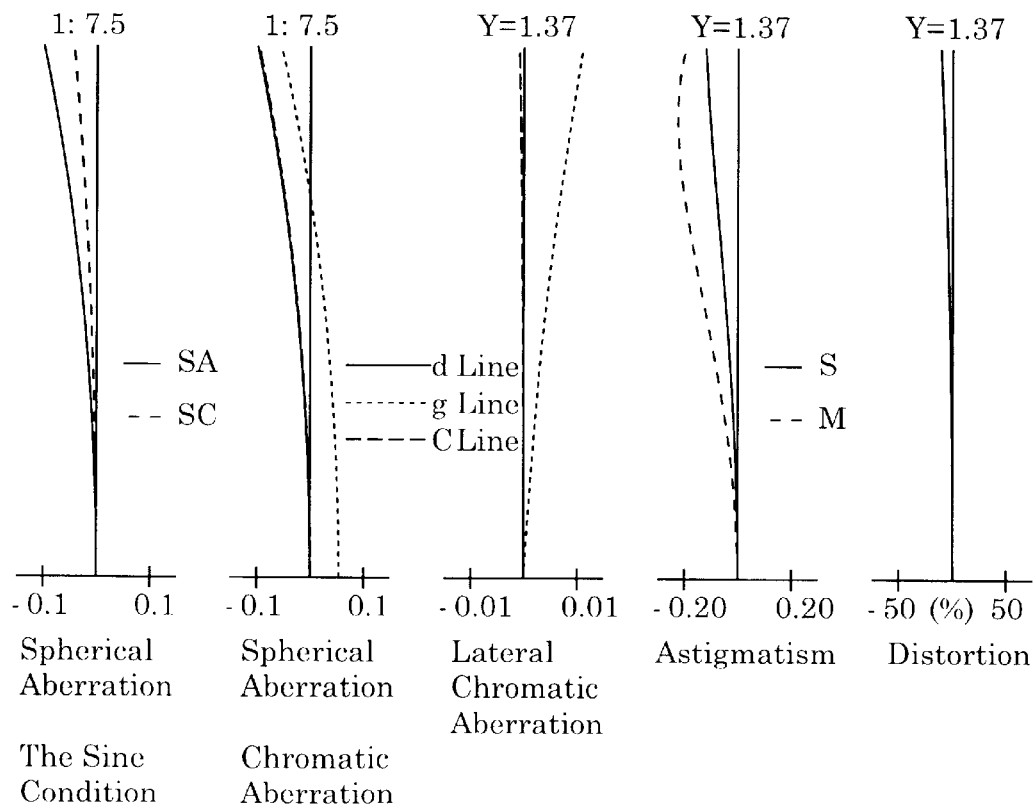
FIGS. 4A, 4B, 4C, 4D and 4E show aberrations occurred in the lens arrangement of FIG. 3.

FIGS. 1 through 4E show the endoscope objective optical system, according to the first embodiment. FIG. 1 shows the lens arrangement of the endoscope objective optical system at the short focal length extremity. FIGS. 2A through 2E show aberrations occurred in the lens arrangement of FIG. 1. FIG. 3 shows the lens arrangement of the endoscope objective optical system at the long focal length extremity. FIGS. 4A through 4E show aberrations occurred in the lens arrangement of FIG. 3. Table 1 shows the numerical values of the first embodiment. The negative first lens group 11 includes a negative lens element. The positive second lens group 12 includes a positive lens element, and cemented lens elements having a positive lens element and a negative lens element, in this order from the object.

TABLE 1

FE = 5.8–7.5
f = 1.28–1.89
ODIS_w = −10
ODIS_t = −2.5
$f_B$ = 0.05–0.05
W = 70.1–36.3
m = −0.12—−0.66
m2T = −2.02
m2W = −1.06

| Surface No. | r | d | Nd | ν |
|---|---|---|---|---|
| 1 | ∞ | 0.30 | 1.88300 | 40.8 |
| 2 | 1.138 | 1.92–1.18 | — | — |
| Diaphragm | ∞ | 0.06 | — | — |
| 3 | 5.481 | 0.80 | 1.83481 | 42.7 |
| 4 | −2.310 | 1.13 | — | — |
| 5 | 9.115 | 0.30 | 1.84666 | 23.8 |
| 6 | 1.338 | 1.31 | 1.58913 | 61.2 |
| 7 | −2.479 | 1.26–3.42 | — | — |
| 8 | ∞ | 1.00 | 1.51633 | 64.1 |
| 9 | ∞ | 0.30 | 1.53113 | 62.4 |
| 10 | ∞ | 0.05–0.05 | — | — |

[Embodiment 2]

Figure 5:
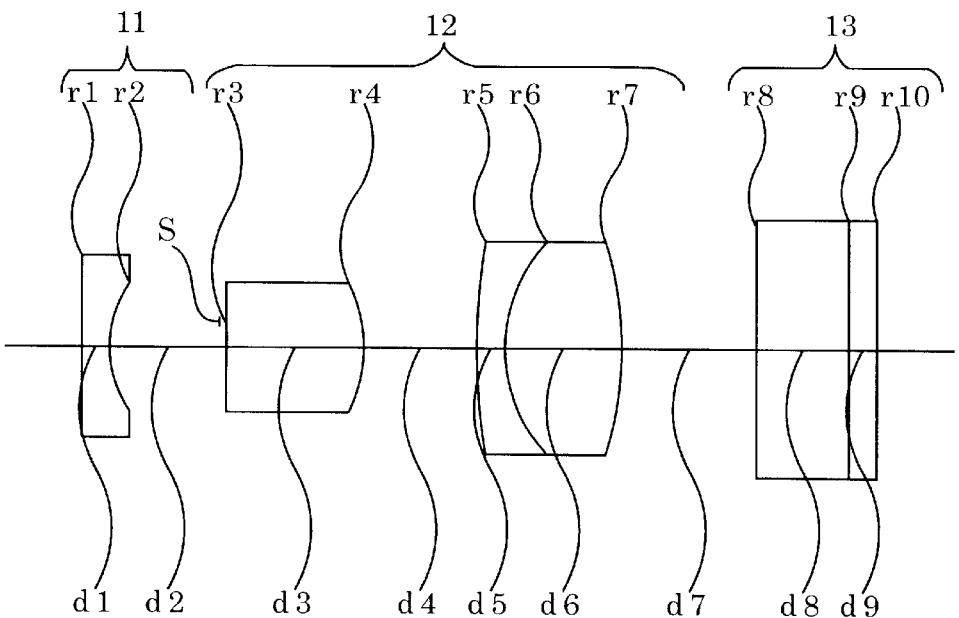
FIG. 5 shows a lens arrangement of an endoscope objective optical system at the short focal length extremity, according to a second embodiment of the present invention.
Figures 6A, 6B, 6C, 6D, 6E:
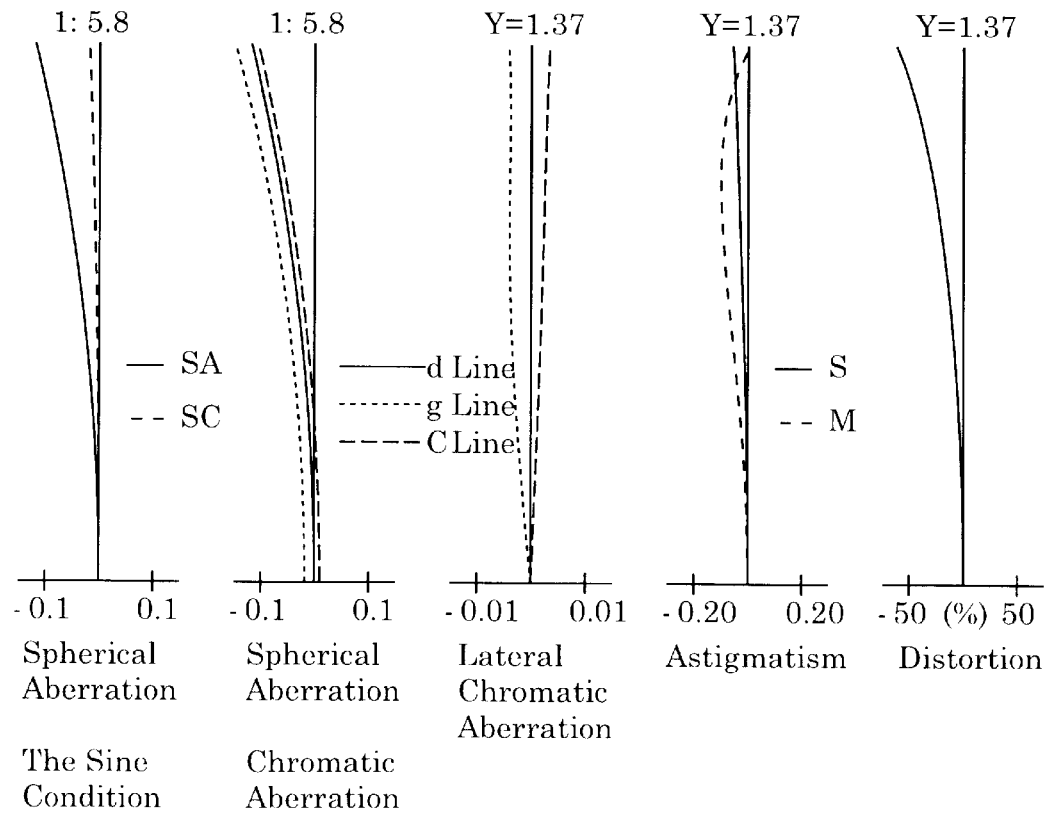
FIGS. 6A, 6B, 6C, 6D and 6E show aberrations occurred in the lens arrangement of FIG. 5.
Figure 7:
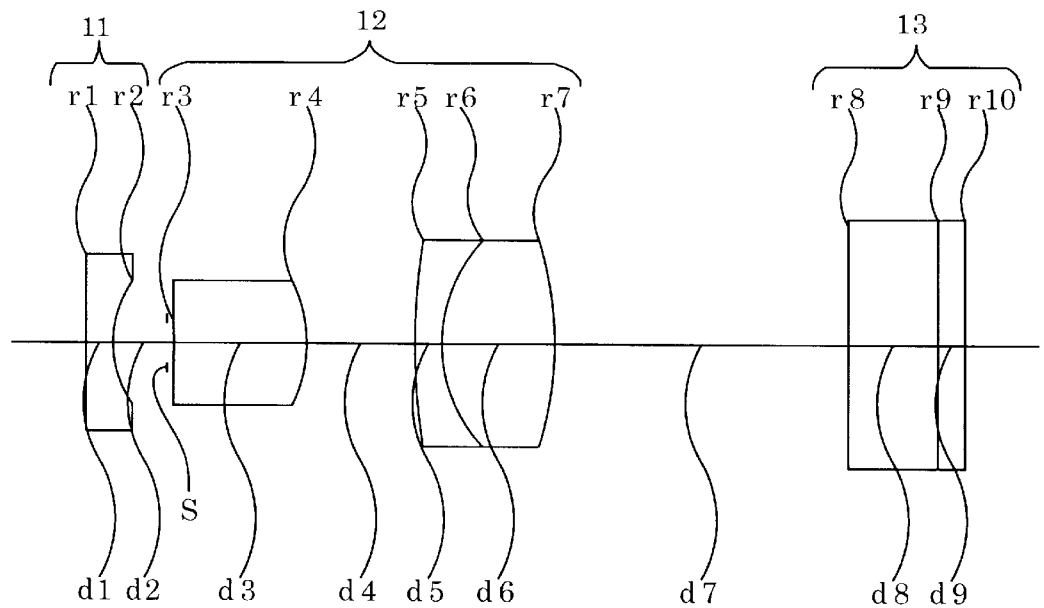
FIG. 7 shows a lens arrangement of the endoscope objective optical system at the long focal length extremity, according to the second embodiment of the present invention.
Figures 8A, 8B, 8C, 8D, 8E:
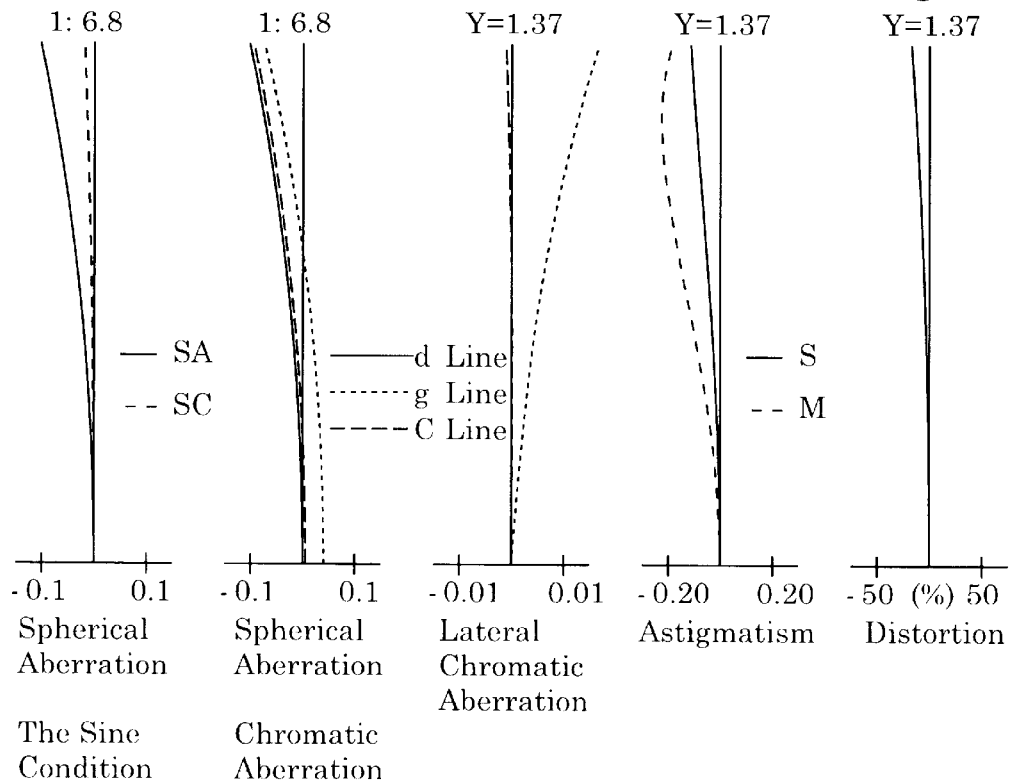
FIGS. 8A, 8B, 8C, 8D and 8E show aberrations occurred in the lens arrangement of FIG. 7.

FIGS. 5 through 8E show the endoscope objective optical system, according to the second embodiment. FIG. 5 shows the lens arrangement of the endoscope objective optical system at the short focal length extremity. FIGS. 6A through 6E show aberrations occurred in the lens arrangement of FIG. 5. FIG. 7 shows the lens arrangement of the endoscope objective optical system at the long focal length extremity. FIGS. 8A through 8E show aberrations occurred in the lens arrangement of FIG. 7. Table 2 shows the numerical values of the second embodiment. The basic lens arrangement of the second embodiment is the same as the first embodiment.

TABLE 2

FE = 5.8–6.8
f = 1.33–1.85
ODIS_w = −10
ODIS_t = −2.5
$f_B$ = 0.05–0.05
W = 70.3–40.0
m = −0.13—−0.66
m2T = −1.93
m2W = −1.05

| Surface No. | r | d | Nd | ν |
|---|---|---|---|---|
| 1 | ∞ | 0.30 | 1.88300 | 40.8 |
| 2 | 1.215 | 1.19–0.60 | — | — |
| Diaphragm | ∞ | 0.08 | — | — |
| 3 | −6.494 | 1.48 | 1.86300 | 41.5 |
| 4 | −1.595 | 1.22 | — | — |
| 5 | 7.393 | 0.30 | 1.92286 | 18.9 |
| 6 | 1.698 | 1.26 | 1.68250 | 44.7 |
| 7 | −3.935 | 1.47–3.29 | — | — |
| 8 | ∞ | 1.00 | 1.51633 | 64.1 |
| 9 | ∞ | 0.30 | 1.53113 | 62.4 |
| 10 | ∞ | 0.05–0.05 | — | — |

[Embodiment 3]

Figure 9:
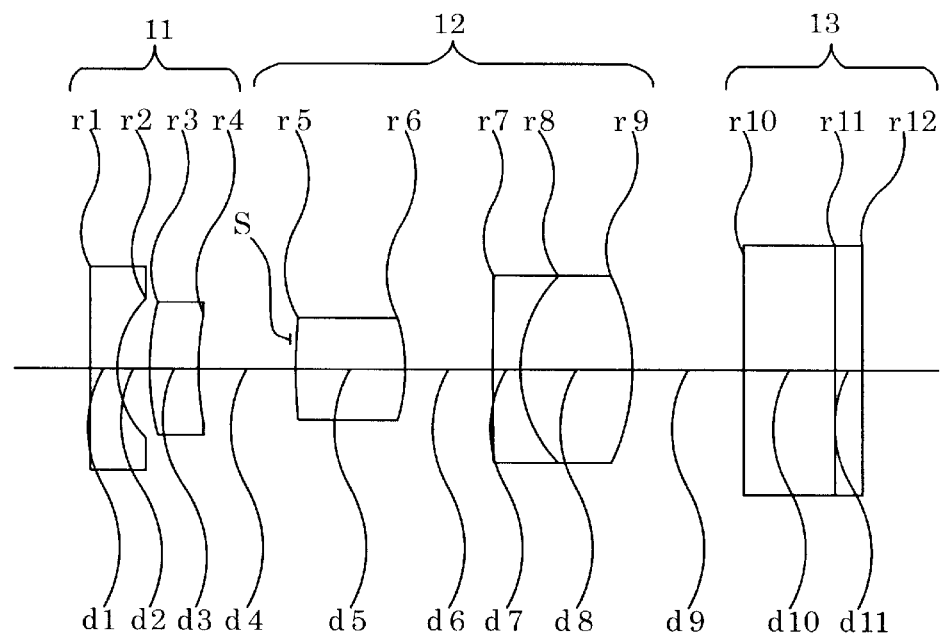
FIG. 9 shows a lens arrangement of an endoscope objective optical system at the short focal length extremity, according to a third embodiment of the present invention.
Figures 10A, 10B, 10C, 10D, 10E:
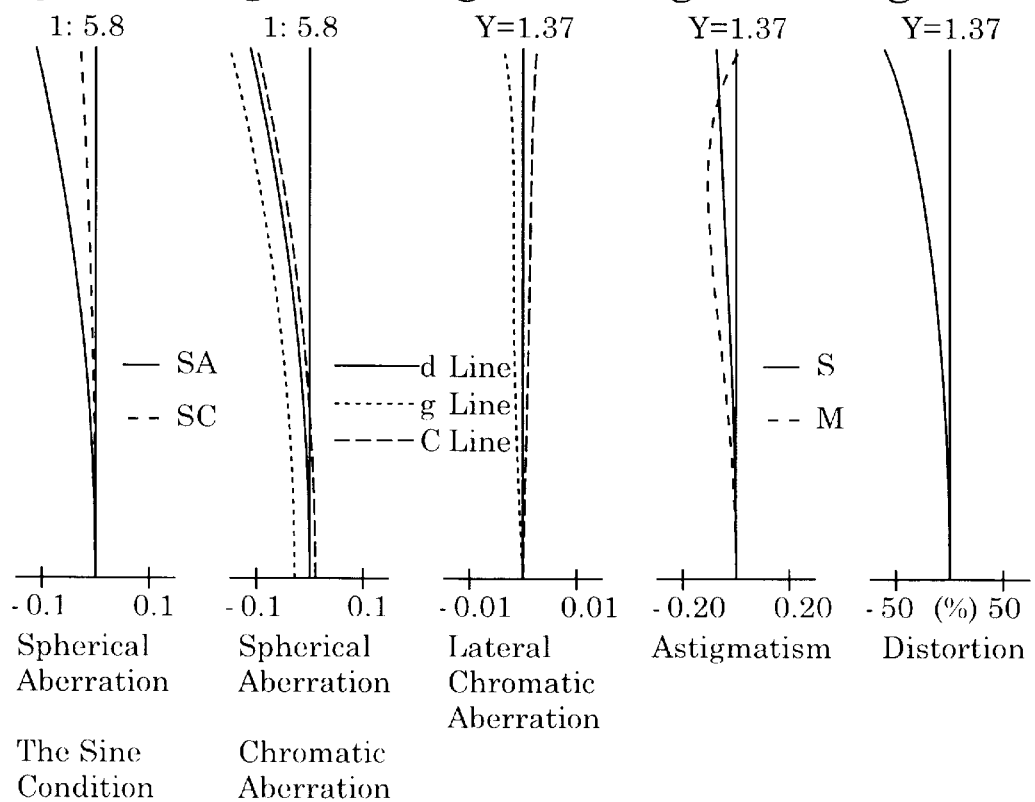
FIGS. 10A, 10B, 10C, 10D and 10E show aberrations occurred in the lens arrangement of FIG. 9.
Figure 11:
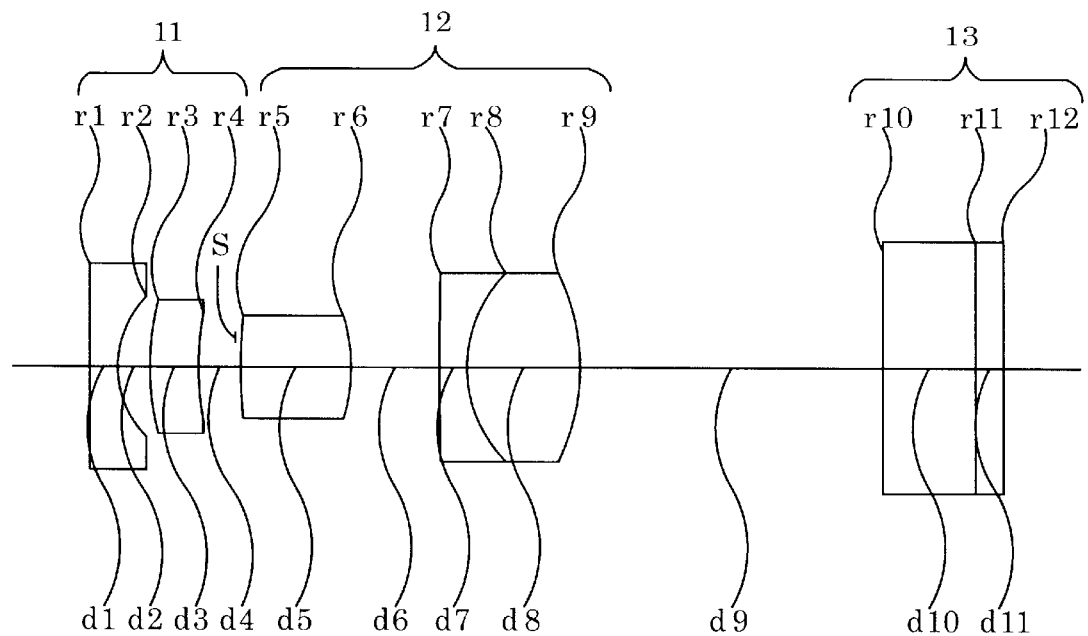
FIG. 11 shows a lens arrangement of the endoscope objective optical system at the long focal length extremity, according to the third embodiment of the present invention.
Figures 12A, 12B, 12C, 12D, 12E:
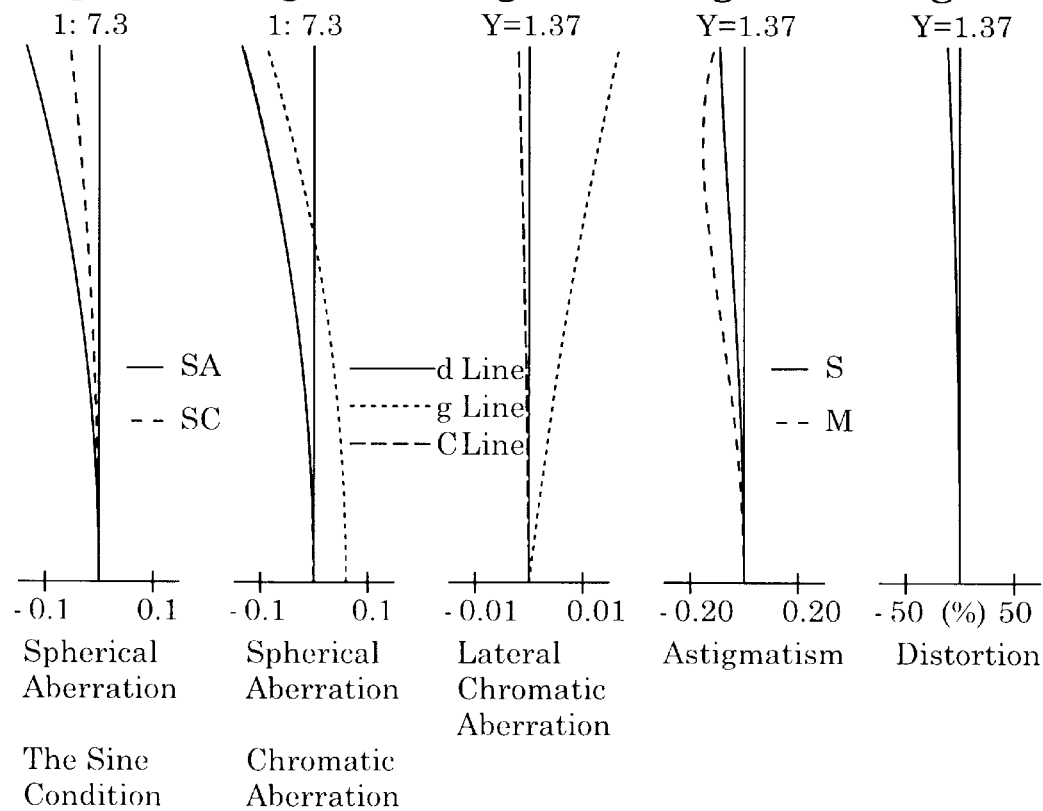
FIGS. 12A, 12B, 12C, 12D and 12E show aberrations occurred in the lens arrangement of FIG. 11.

FIGS. 9 through 12E show the endoscope objective optical system, according to the third embodiment. FIG. 9 shows the lens arrangement of the endoscope objective optical system at the short focal length extremity. FIGS. 10A through 10E show aberrations occurred in the lens arrangement of FIG. 9. FIG. 11 shows the lens arrangement of the endoscope objective optical system at the long focal length extremity. FIGS. 12A through 12E show aberrations occurred in the lens arrangement of FIG. 11. Table 3 shows the numerical values of the third embodiment. The basic lens arrangement of the third embodiment is the same as the first embodiment, except that the negative first lens group 11 includes a negative lens element and a positive lens element, in this order from the object.

TABLE 3

FE = 5.8–7.3
f = 1.29–1.88
ODIS_w = −10
ODIS_t = −2.5
$f_B$ = 0.05–0.05
W = 70.2–36.6
m = −0.12—−0.66
m2T = −2.13
m2W = −1.14

| Surface No. | r | d | Nd | ν |
|---|---|---|---|---|
| 1 | ∞ | 0.30 | 1.88300 | 40.8 |
| 2 | 1.098 | 0.35 | — | — |
| 3 | 3.000 | 0.53 | 1.84666 | 23.8 |
| 4 | 3.177 | 1.01–0.40 | — | — |
| Diaphragm | ∞ | 0.06 | — | — |
| 5 | 6.189 | 1.20 | 1.88300 | 40.8 |
| 6 | −1.954 | 0.96 | — | — |
| 7 | 47.880 | 0.30 | 1.84666 | 23.8 |
| 8 | 1.465 | 1.23 | 1.58913 | 61.2 |
| 9 | −2.365 | 1.22–3.28 | — | — |
| 10 | ∞ | 1.00 | 1.51633 | 64.1 |
| 11 | ∞ | 0.30 | 1.53113 | 62.4 |
| 12 | ∞ | 0.05–0.05 | — | — |

[Embodiment 4]

Figure 13:
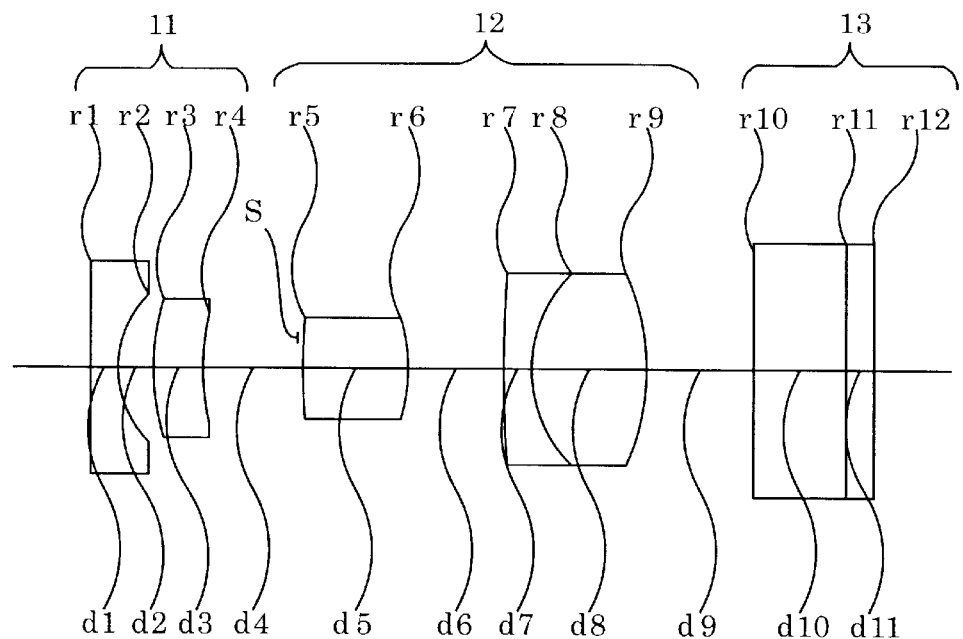
FIG. 13 shows a lens arrangement of an endoscope objective optical system at the short focal length extremity, according to a fourth embodiment of the present invention.
Figures 14A, 14B, 14C, 14D, 14E:
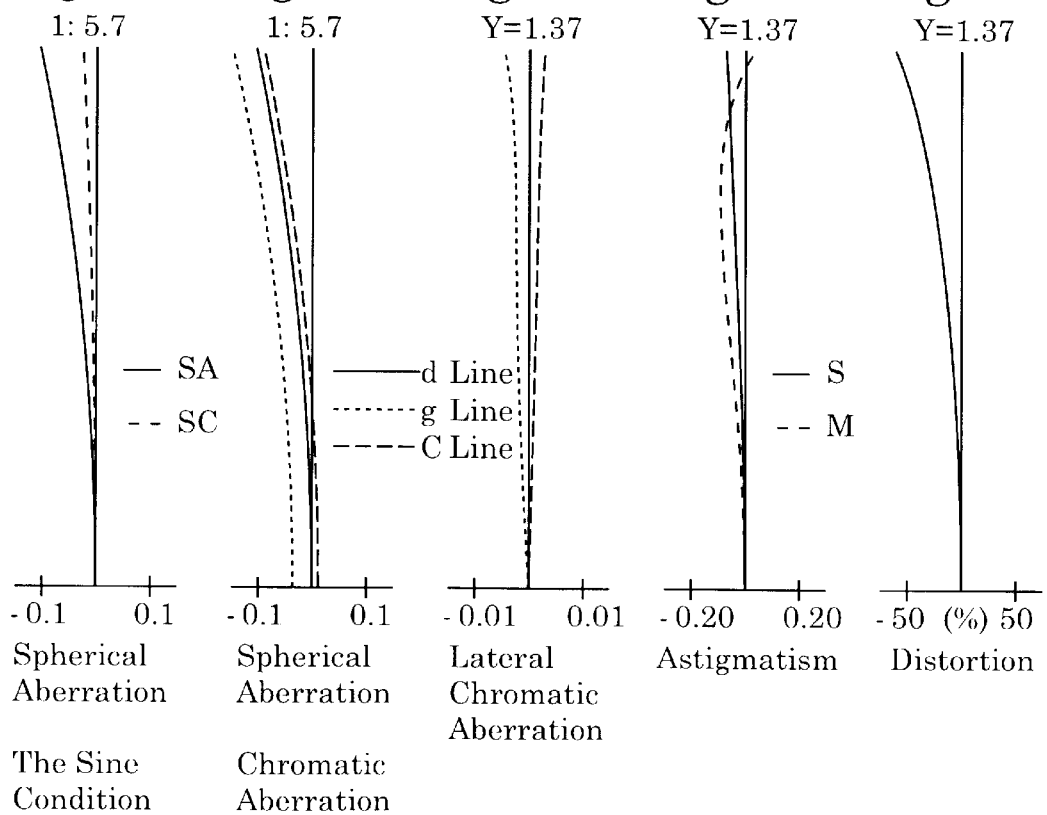
FIGS. 14A, 14B, 14C, 14D and 14E show aberrations occurred in the lens arrangement of FIG. 13.
Figure 15:
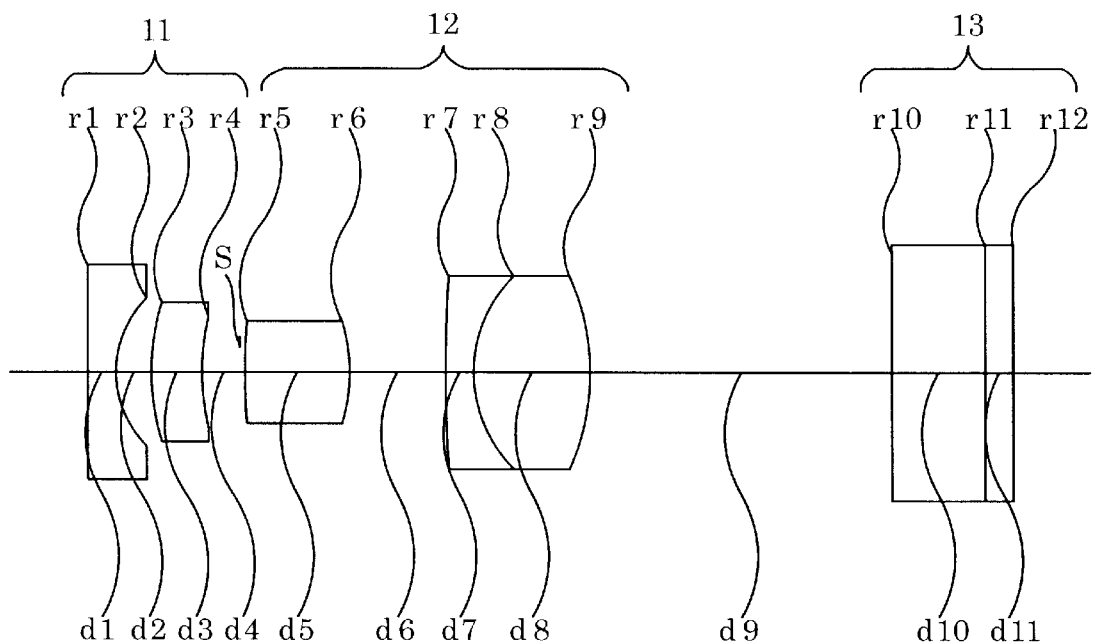
FIG. 15 shows a lens arrangement of the endoscope objective optical system at the long focal length extremity, according to the fourth embodiment of the present invention.
Figures 16A, 16B, 16C, 16D, 16E:
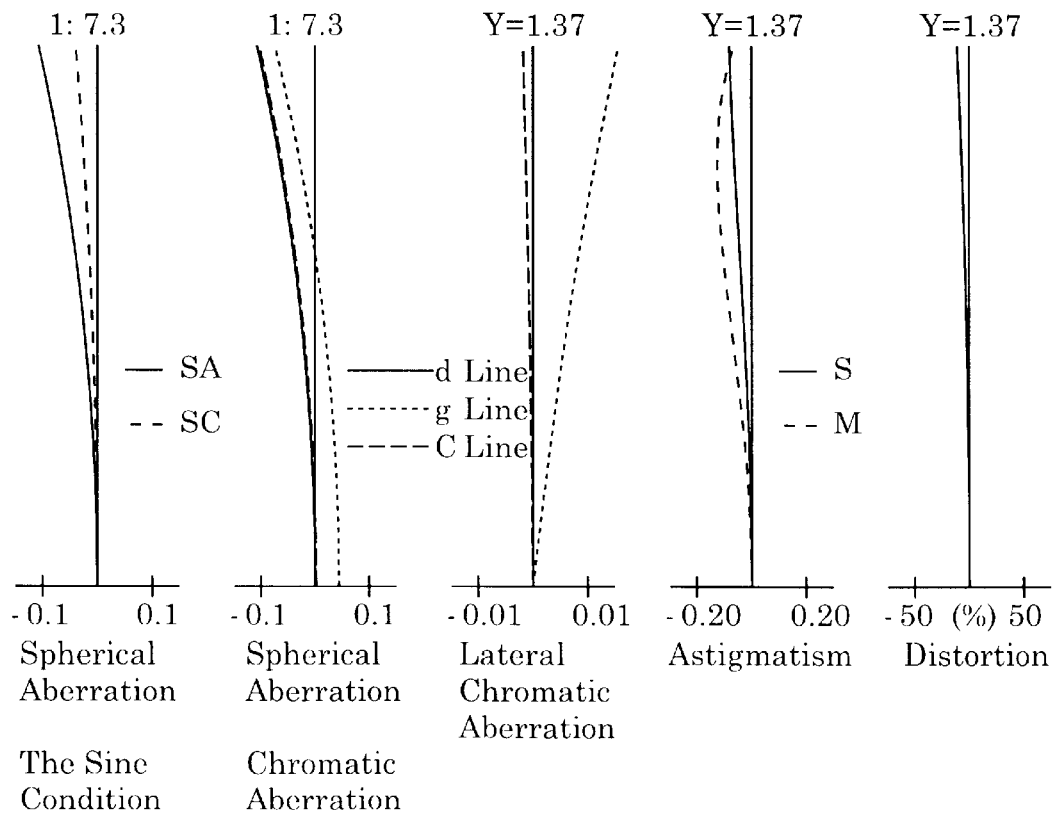
FIGS. 16A, 16B, 16C, 16D and 16E show aberrations occurred in the lens arrangement of FIG. 15.

FIGS. 13 through 16E show the endoscope objective optical system, according to the fourth embodiment. FIG. 13 shows the lens arrangement of the endoscope objective optical system at the short focal length extremity. FIGS. 14A through 14E show aberrations occurred in the lens arrangement of FIG. 13. FIG. 15 shows the lens arrangement of the endoscope objective optical system at the long focal length extremity. FIGS. 16A through 16E show aberrations occurred in the lens arrangement of FIG. 15. Table 4 shows the numerical values of the fourth embodiment. The basic lens arrangement of the fourth embodiment is the same as the third embodiment.

TABLE 4

FE = 5.7–7.3
f = 1.30–1.89
ODIS_w = −10
ODIS_t = −2.5
$f_B$ = 0.05–0.05
W = 70.3–36.3
m = −0.12—−0.66
m2T = −2.12
m2W = −1.12

| Surface No. | r | d | Nd | ν |
|---|---|---|---|---|
| 1 | ∞ | 0.30 | 1.88300 | 40.8 |
| 2 | 1.138 | 0.38 | — | — |
| 3 | 2.586 | 0.54 | 1.84666 | 23.8 |
| 4 | 2.632 | 1.02–0.40 | — | — |
| Diaphragm | ∞ | 0.06 | — | — |
| 5 | 7.835 | 1.13 | 1.88300 | 40.8 |
| 6 | −1.920 | 1.03 | — | — |
| 7 | 15.798 | 0.30 | 1.84666 | 23.8 |
| 8 | 1.466 | 1.24 | 1.58913 | 61.2 |

TABLE 4-continued

| | | | | |
|---|---|---|---|---|
| 9 | −2.543 | 1.16–3.23 | — | — |
| 10 | ∞ | 1.00 | 1.51633 | 64.1 |
| 11 | ∞ | 0.30 | 1.53113 | 62.4 |
| 12 | ∞ | 0.05–0.05 | — | — |

[Embodiment 5]

Figure 17:
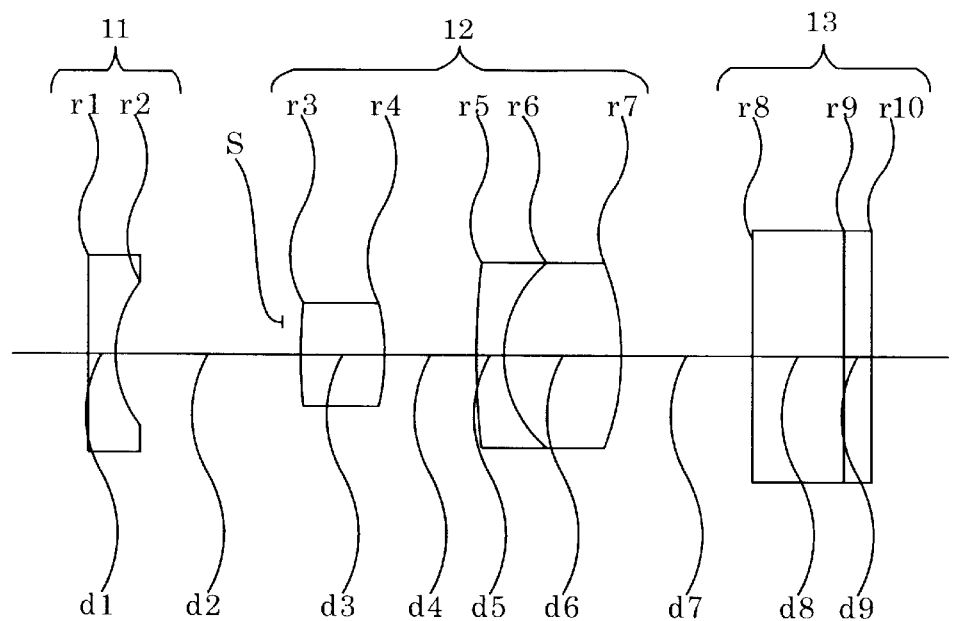
FIG. 17 shows a lens arrangement of an endoscope objective optical system at the short focal length extremity, according to a fifth embodiment of the present invention.
Figures 18A, 18B, 18C, 18D, 18E:
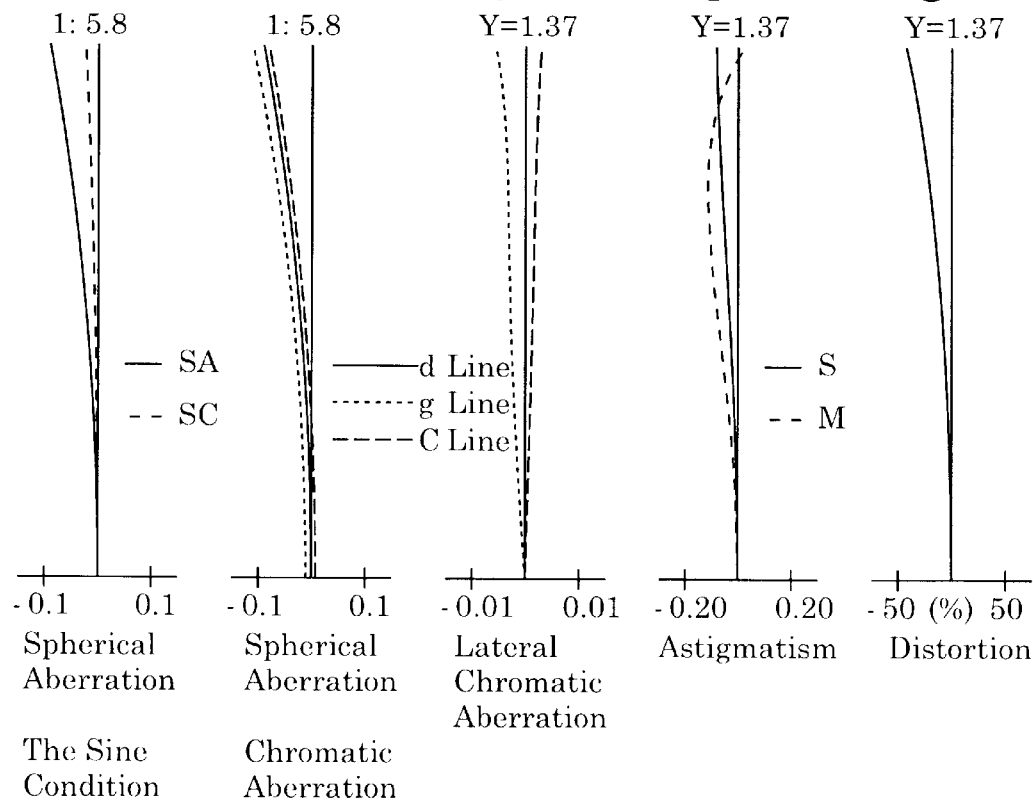
FIGS. 18A, 18B, 18C, 18D and 18E show aberrations occurred in the lens arrangement of FIG. 17.
Figure 19:
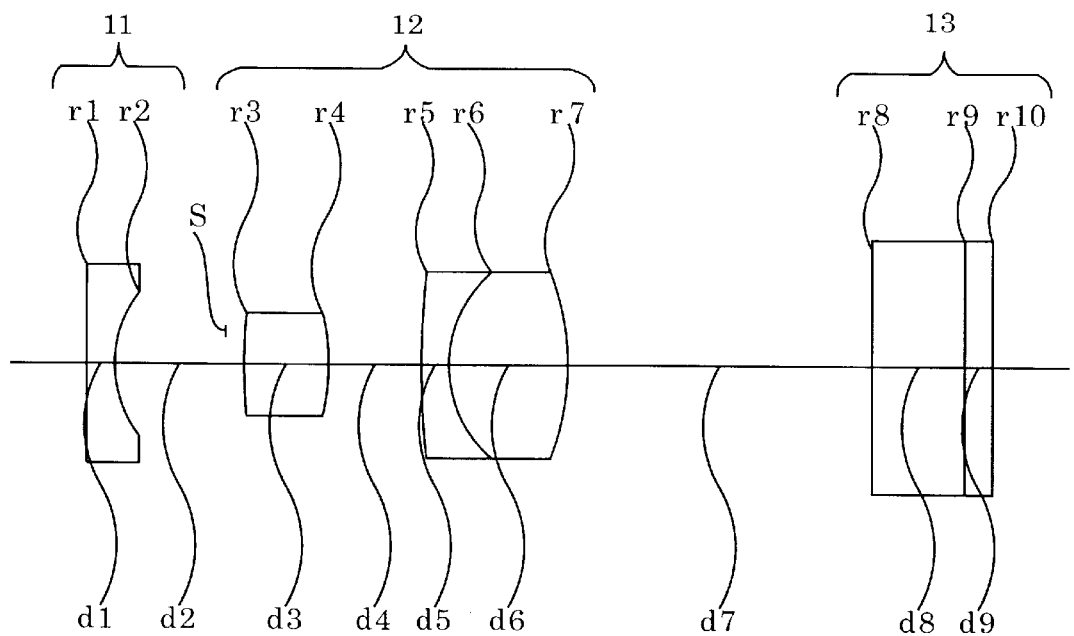
FIG. 19 shows a lens arrangement of the endoscope objective optical system at the long focal length extremity, according to the fifth embodiment of the present invention.
Figures 20A, 20B, 20C, 20D, 20E:
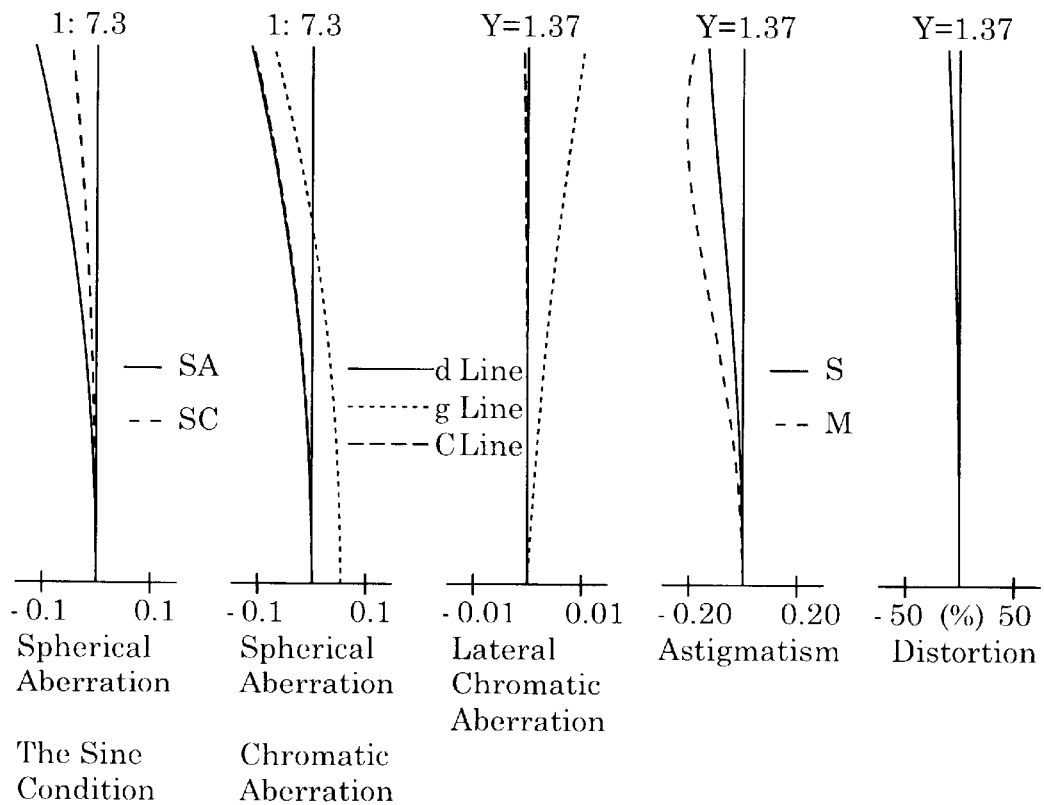
FIGS. 20A, 20B, 20C, 20D and 20E show aberrations occurred in the lens arrangement of FIG. 19.

FIGS. 17 through 20E show the endoscope objective optical system, according to the fifth embodiment. FIG. 17 shows the lens arrangement of the endoscope objective optical system at the short focal length extremity. FIGS. 18A through 18E show aberrations occurred in the lens arrangement of FIG. 17. FIG. 19 shows the lens arrangement of the endoscope objective optical system at the long focal length extremity. FIGS. 20A through 20E show aberrations occurred in the lens arrangement of FIG. 19. Table 5 shows the numerical values of the fifth embodiment. The basic lens arrangement of the fifth embodiment is the same as the first embodiment.

TABLE 5

FE = 5.8–7.3
f = 1.40–1.90
ODIS_w = −10
ODIS_t = −2.5
f$_B$ = 0.05–0.05
W = 59.9–35.9
m = −0.13—0.66
m2T = −1.87
m2W = −1.04

| Surface No. | r | d | Nd | ν |
|---|---|---|---|---|
| 1 | ∞ | 0.30 | 1.88300 | 40.8 |
| 2 | 1.286 | 1.82–1.20 | — | — |
| Diaphragm | ∞ | 0.20 | — | — |
| 3 | 5.437 | 0.92 | 1.83481 | 42.7 |
| 4 | −2.407 | 1.01 | — | — |
| 5 | 9.163 | 0.30 | 1.84666 | 23.8 |
| 6 | 1.335 | 1.29 | 1.58913 | 61.2 |
| 7 | −2.782 | 1.44–3.29 | — | — |
| 8 | ∞ | 1.00 | 1.51633 | 64.1 |
| 9 | ∞ | 0.30 | 1.53113 | 62.4 |
| 10 | ∞ | 0.05–0.05 | — | — |

[Embodiment 6]

Figure 21:
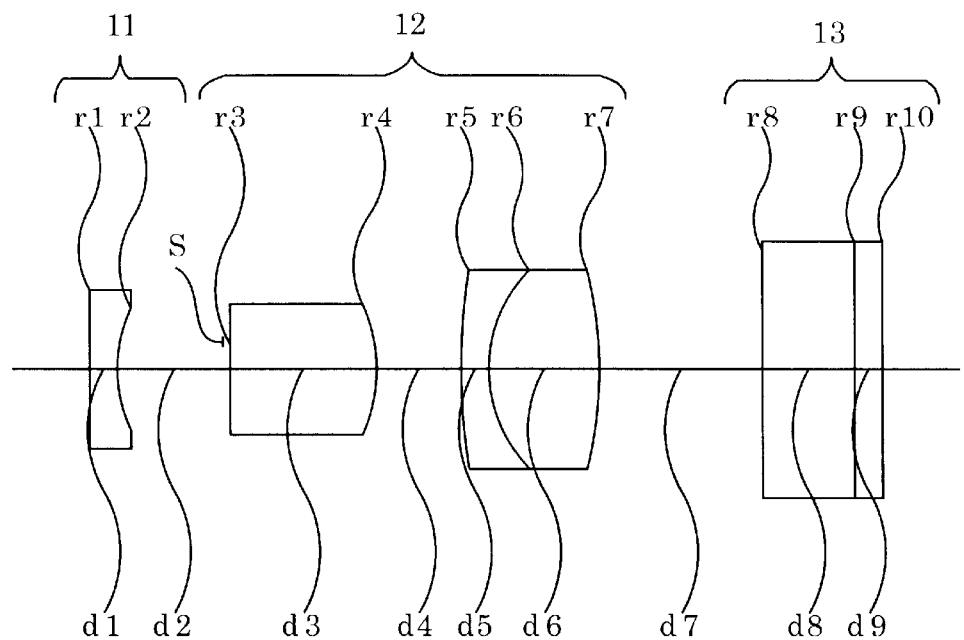
FIG. 21 shows a lens arrangement of an endoscope objective optical system at the short focal length extremity, according to a sixth embodiment of the present invention.
Figures 22A, 22B, 22C, 22D, 22E:
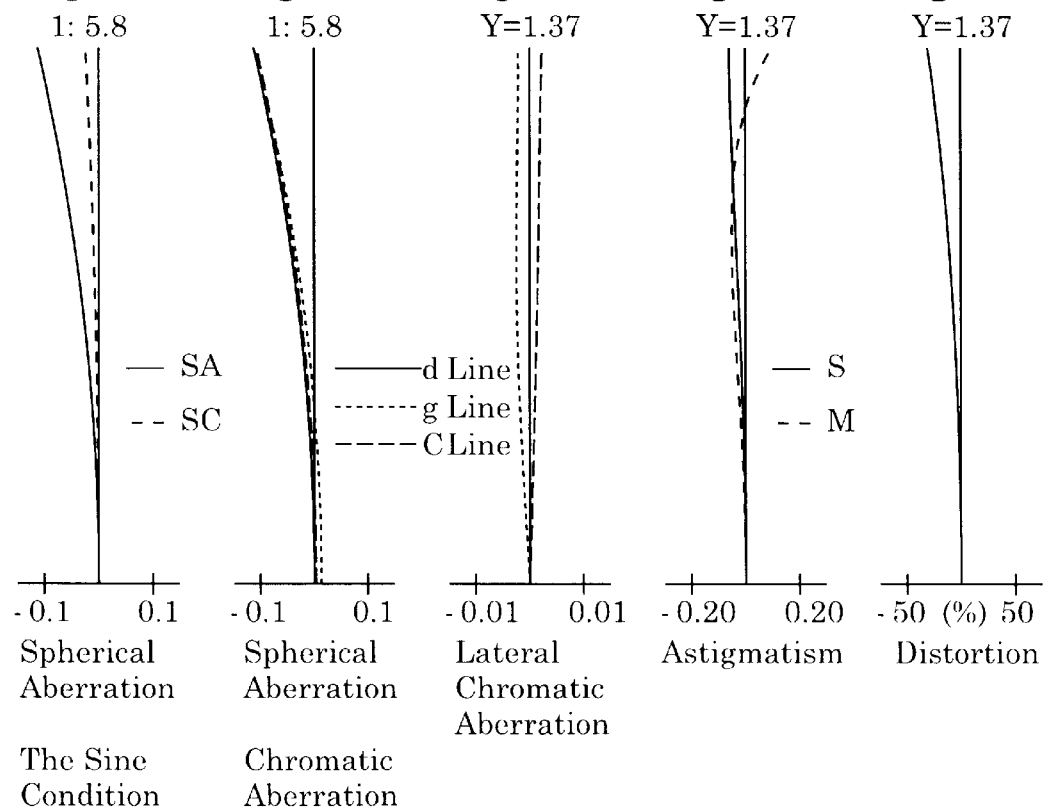
FIGS. 22A, 22B, 22C, 22D and 22E show aberrations occurred in the lens arrangement of FIG. 21.
Figure 23:
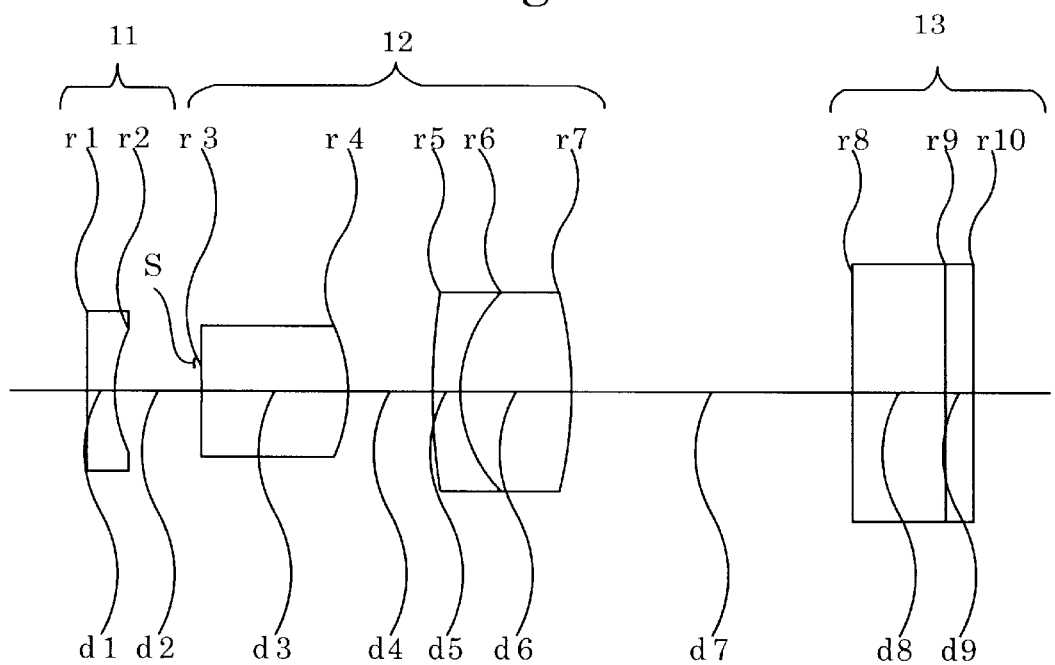
FIG. 23 shows a lens arrangement of the endoscope objective optical system at the long focal length extremity, according to the sixth embodiment of the present invention.
Figures 24A, 24B, 24C, 24D, 24E:
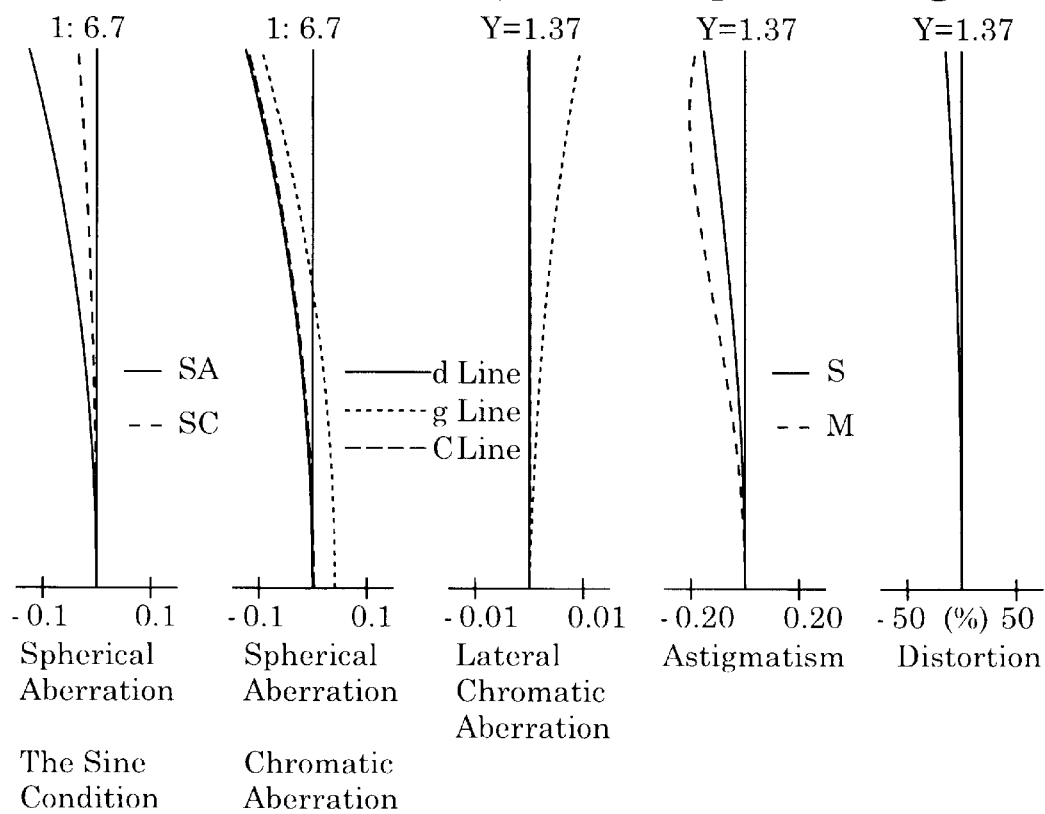
FIGS. 24A, 24B, 24C, 24D and 24E show aberrations occurred in the lens arrangement of FIG. 23.

FIGS. 21 through 24E show the endoscope objective optical system, according to the sixth embodiment. FIG. 21 shows the lens arrangement of the endoscope objective optical system at the short focal length extremity. FIGS. 22A through 22E show aberrations occurred in the lens arrangement of FIG. 21. FIG. 23 shows the lens arrangement of the endoscope objective optical system at the long focal length extremity. FIGS. 24A through 24E show aberrations occurred in the lens arrangement of FIG. 23. Table 6 shows the numerical values of the sixth embodiment. The basic lens arrangement of the sixth embodiment is the same as the first embodiment.

TABLE 6

FE = 5.8–6.7
f = 1.64–1.88
ODIS_w = −10
ODIS_t = −2.5
f$_B$ = 0.05–0.05
W = 50.2–37.8
m = −0.16—0.66
m2T = −1.65
m2W = −1.04

| Surface No. | r | d | Nd | ν |
|---|---|---|---|---|
| 1 | ∞ | 0.30 | 1.88300 | 40.8 |
| 2 | 1.573 | 1.15–0.86 | — | — |
| Diaphragm | ∞ | 0.08 | — | — |
| 3 | −19.479 | 1.58 | 1.80400 | 46.6 |
| 4 | −1.732 | 0.91 | — | — |
| 5 | 7.086 | 0.30 | 1.84666 | 23.8 |
| 6 | 1.543 | 1.20 | 1.64000 | 60.1 |
| 7 | −4.449 | 1.77–3.04 | — | — |
| 8 | ∞ | 1.00 | 1.51633 | 64.1 |
| 9 | ∞ | 0.30 | 1.53113 | 62.4 |
| 10 | ∞ | 0.05–0.05 | — | — |

[Embodiment 7]

Figure 25:
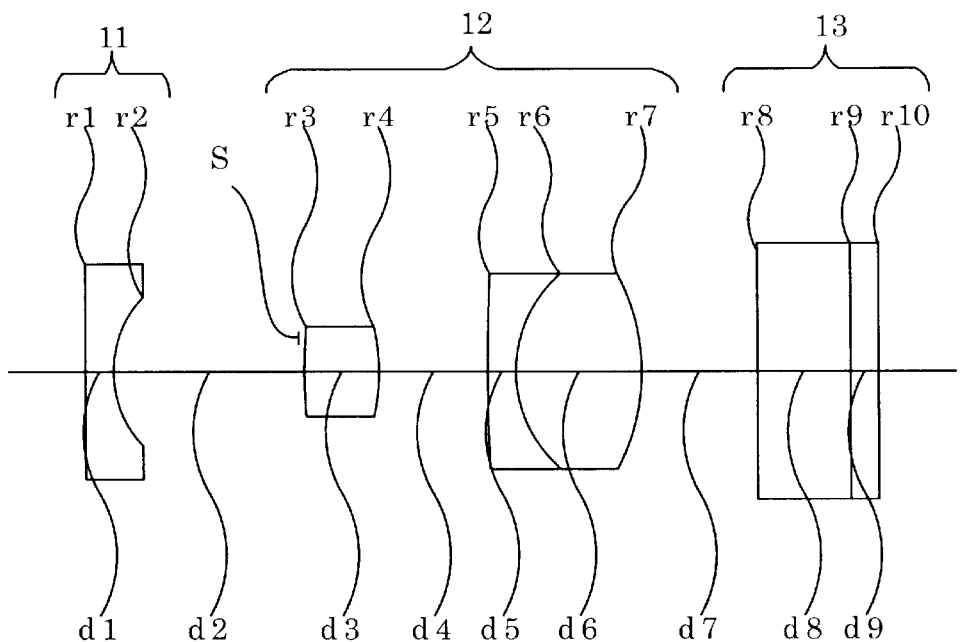
FIG. 25 shows a lens arrangement of an endoscope objective optical system at the short focal length extremity, according to a seventh embodiment of the present invention.
Figures 26A, 26B, 26C, 26D, 26E:
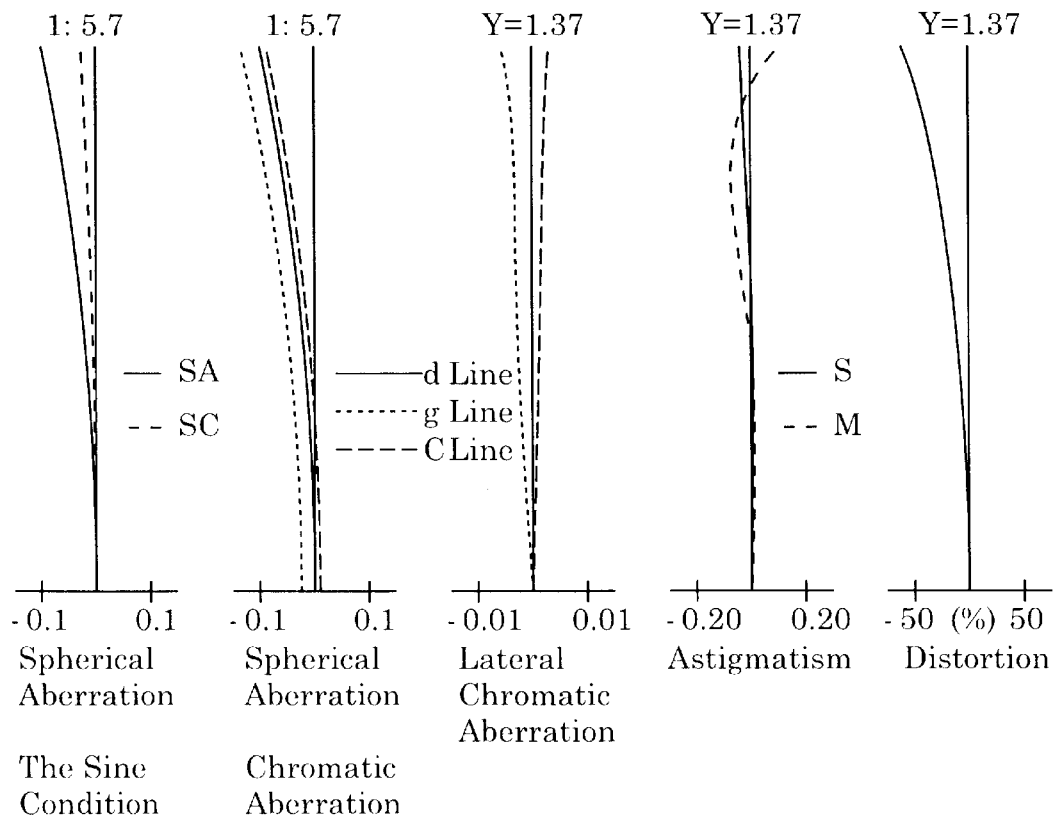
FIGS. 26A, 26B, 26C, 26D and 26E show aberrations occurred in the lens arrangement of FIG. 25.
Figure 27:
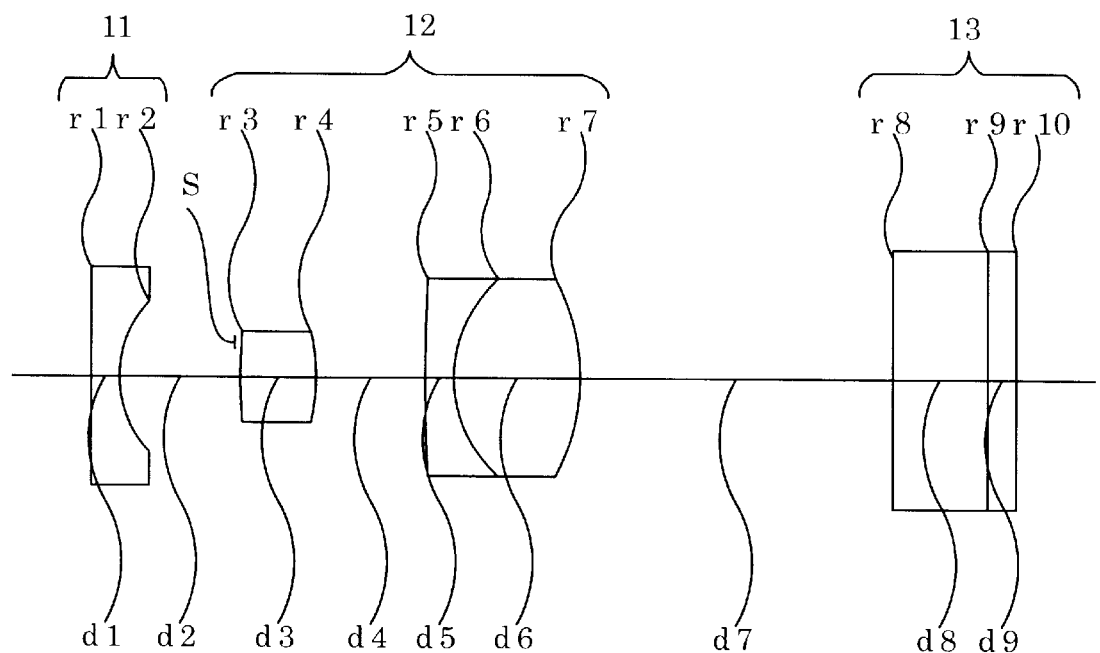
FIG. 27 shows a lens arrangement of the endoscope objective optical system at the long focal length extremity, according to the seventh embodiment of the present invention.
Figures 28A, 28B, 28C, 28D, 28E:
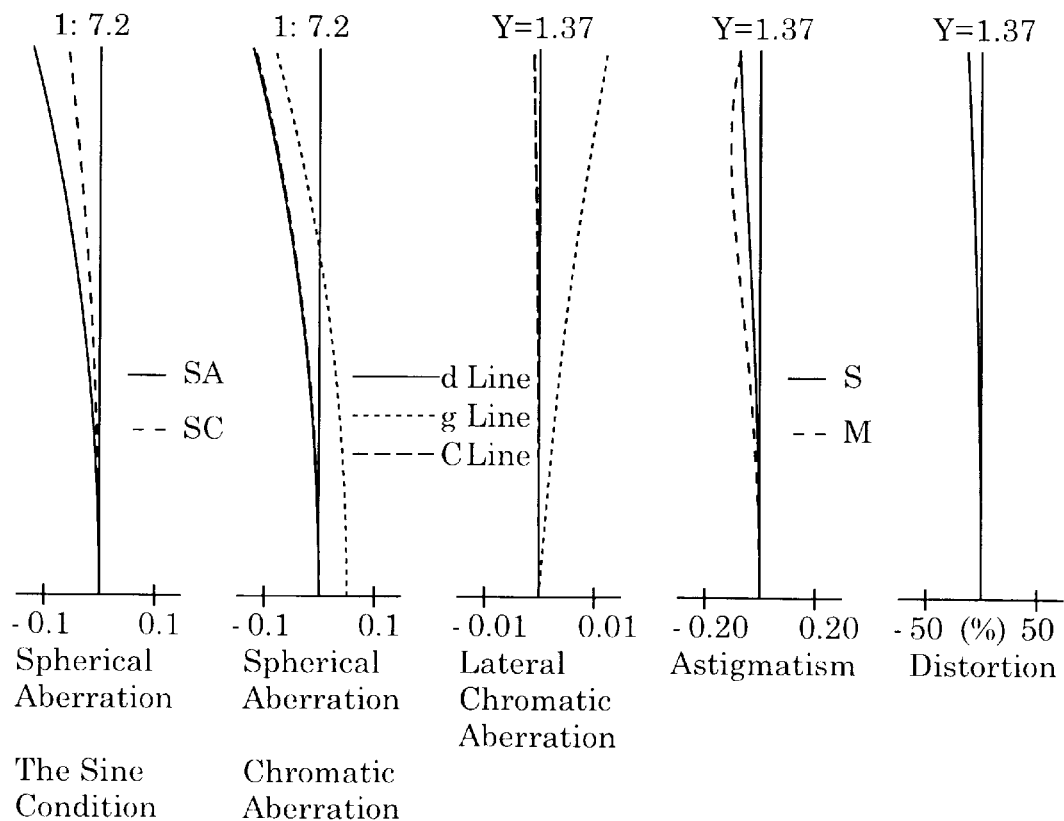
FIGS. 28A, 28B, 28C, 28D and 28E show aberrations occurred in the lens arrangement of FIG. 27.

FIGS. 25 through 28E show the endoscope objective optical system, according to the seventh embodiment. FIG. 25 shows the lens arrangement of the endoscope objective optical system at the short focal length extremity. FIGS. 26A through 26E show aberrations occurred in the lens arrangement of FIG. 25. FIG. 27 shows the lens arrangement of the endoscope objective optical system at the long focal length extremity. FIGS. 28A through 28E show aberrations occurred in the lens arrangement of FIG. 27. Table 7 shows the numerical values of the seventh embodiment. The basic lens arrangement of the seventh embodiment is the same as the first embodiment.

TABLE 7

FE = 5.7–7.2
f = 1.33–1.92
ODIS_w = −10
ODIS_t = −2.5
f$_B$ = 0.05–0.05
W = 70.3–36.6
m = −0.12—0.66
m2T = −1.91
m2W = −1.02

| Surface No. | r | d | Nd | ν |
|---|---|---|---|---|
| 1 | ∞ | 0.30 | 1.88300 | 40.8 |
| 2* | 1.245 | 1.98–1.23 | — | — |
| Diaphragm | ∞ | 0.06 | — | — |
| 3 | 6.264 | 0.80 | 1.83481 | 42.7 |
| 4 | −2.184 | 1.16 | — | — |
| 5 | 22.120 | 0.30 | 1.84666 | 23.8 |
| 6 | 1.402 | 1.34 | 1.58913 | 61.2 |
| 7 | −2.249 | 1.24–3.31 | — | — |
| 8 | ∞ | 1.00 | 1.51633 | 64.1 |
| 9 | ∞ | 0.30 | 1.53113 | 62.4 |
| 10 | ∞ | 0.05–0.05 | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | $0.83199 \times 10^{-1}$ | $-0.99859 \times 10^{-1}$ | $0.86320 \times 10^{-1}$ |

[Embodiment 8]

Figure 29:
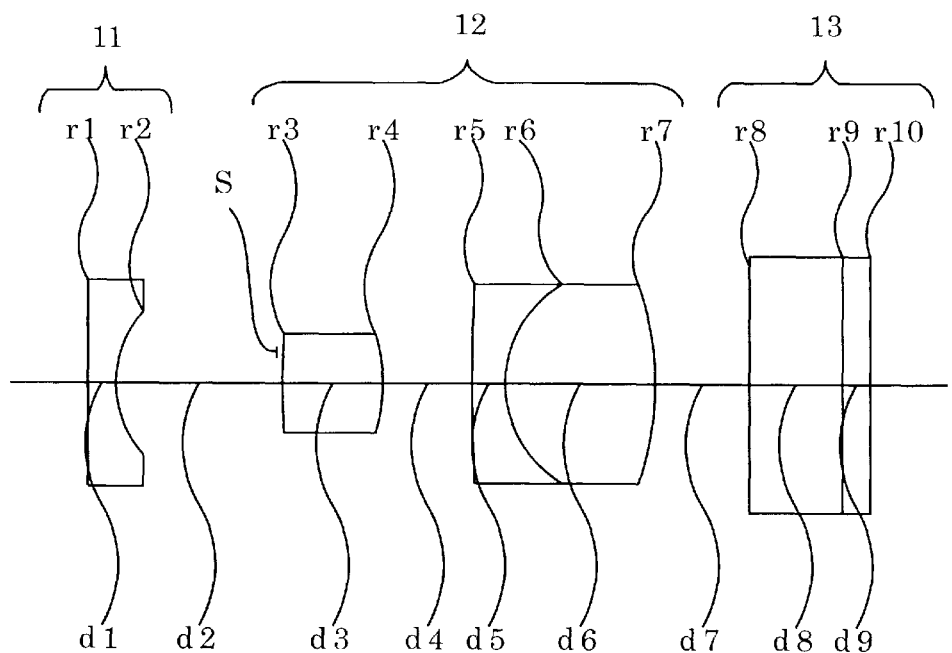
FIG. 29 shows a lens arrangement of an endoscope objective optical system at the short focal length extremity, according to an eighth embodiment of the present invention.
Figures 30A, 30B, 30C, 30D, 30E:
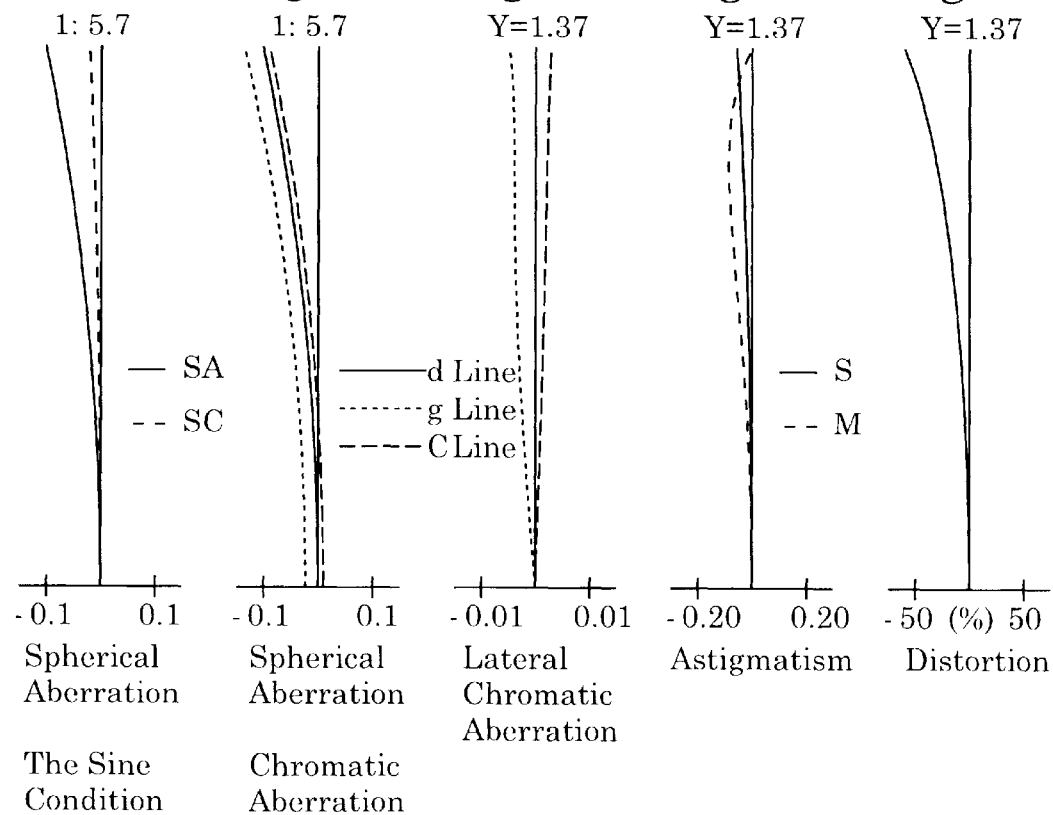
FIGS. 30A, 30B, 30C, 30D and 30E show aberrations occurred in the lens arrangement of FIG. 29.
Figure 31:
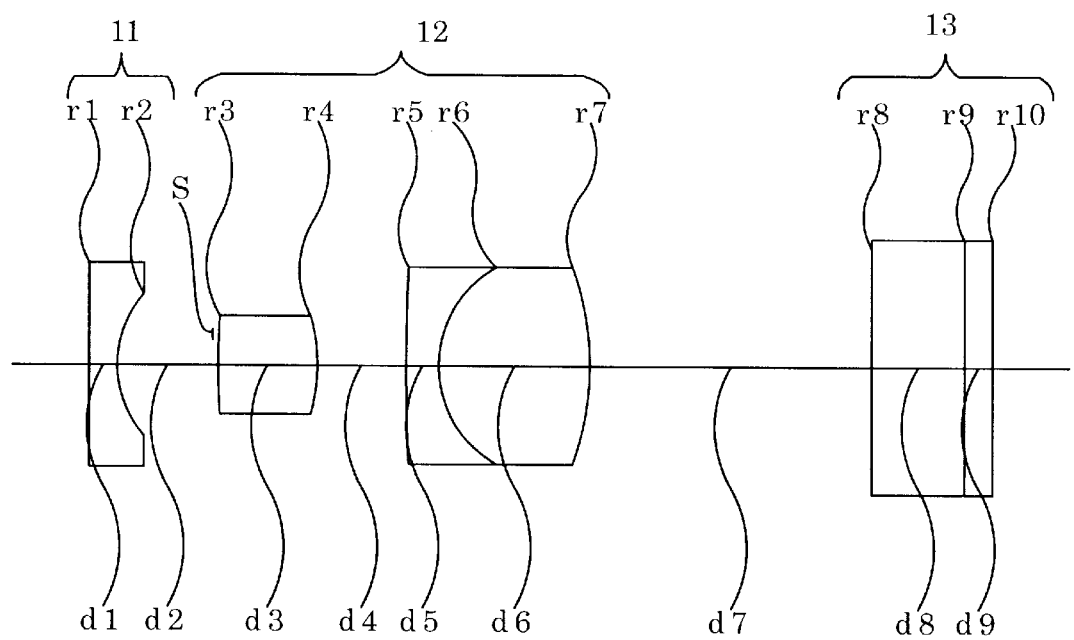
FIG. 31 shows a lens arrangement of the endoscope objective optical system at the long focal length extremity, according to the eighth embodiment of the present invention.
Figures 32A, 32B, 32C, 32D, 32E:
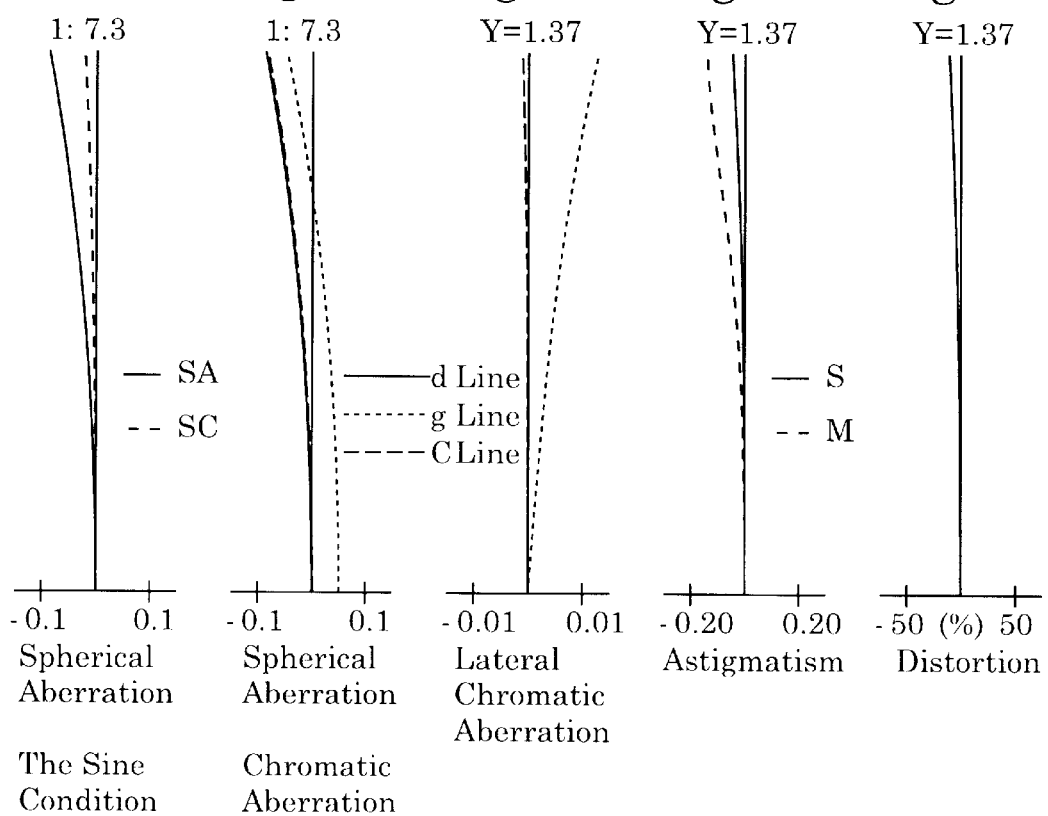
FIGS. 32A, 32B, 32C, 32D and 32E show aberrations occurred in the lens arrangement of FIG. 31.
Figure 33:
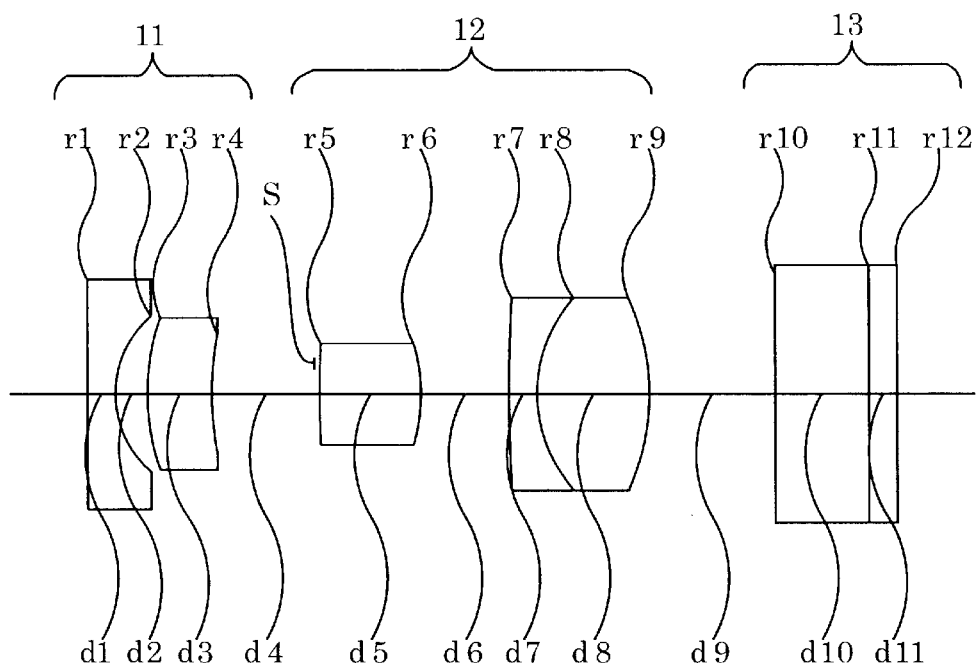
FIG. 33 shows a lens arrangement of an endoscope objective optical system at the short focal length extremity, according to a ninth embodiment of the present invention.

FIGS. 29 through 32E show the endoscope objective optical system, according to the eighth embodiment. FIG. 29 shows the lens arrangement of the endoscope objective optical system at the short focal length extremity. FIGS. 30A through 30E show aberrations occurred in the lens arrangement of FIG. 29. FIG. 31 shows the lens arrangement of the endoscope objective optical system at the long focal length extremity. FIGS. 32A through 32E show aberrations occurred in the lens arrangement of FIG. 31. Table 8 shows the numerical values of the eighth embodiment. The basic lens arrangement of the eighth embodiment is the same as the first embodiment.

TABLE 8

FE = 5.7–7.3
f = 1.28–1.87
ODIS_w = −10
ODIS_t = −2.5
$f_B$ = 0.05–0.05
W = 70.2–36.7
m = −0.12—−0.66
m2T = −1.99
m2W = −1.04

| Surface No. | r | d | Nd | ν |
|---|---|---|---|---|
| 1 | ∞ | 0.30 | 1.88300 | 40.8 |
| 2 | 1.161 | 1.73–1.03 | — | — |
| Diaphragm | ∞ | 0.05 | — | — |
| 3 | 8.391 | 1.07 | 1.88300 | 40.8 |
| 4 | −1.967 | 0.97 | — | — |
| 5 | 23.147 | 0.35 | 1.84666 | 23.8 |
| 6 | 1.246 | 1.62 | 1.66910 | 55.4 |
| 7* | −3.136 | 1.01–3.05 | — | — |
| 8 | ∞ | 1.00 | 1.51633 | 64.1 |
| 9 | ∞ | 0.30 | 1.53113 | 62.4 |
| 10 | ∞ | 0.05–0.05 | — | — |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 7 | 0.00 | 0.76338 × $10^{-2}$ | −0.29502 × $10^{-2}$ | — |

[Embodiment 9]

Figures 34A, 34B, 34C, 34D, 34E:
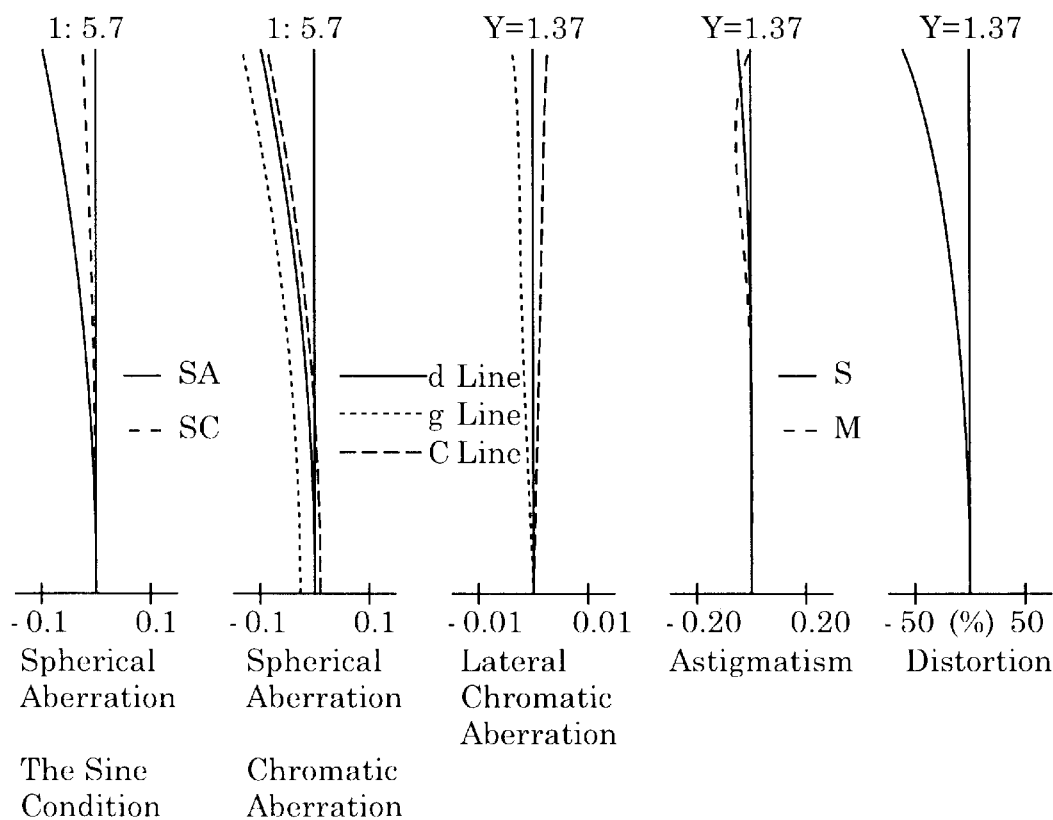
FIGS. 34A, 34B, 34C, 34D and 34E show aberrations occurred in the lens arrangement of FIG. 33.
Figure 35:
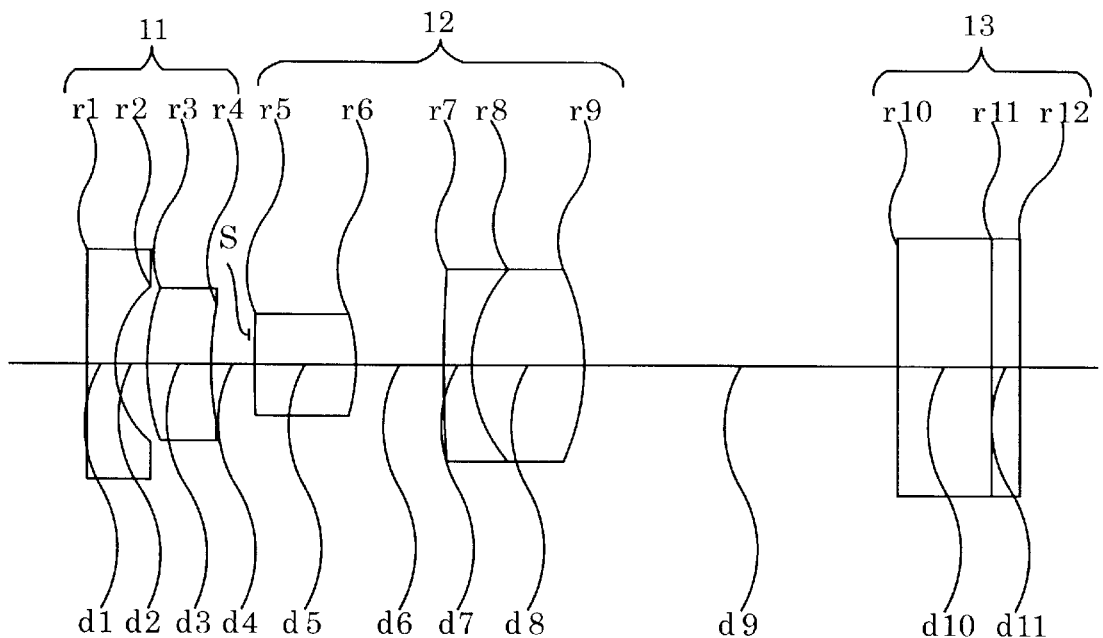
FIG. 35 shows a lens arrangement of the endoscope objective optical system at the long focal length extremity, according to the ninth embodiment of the present invention.
Figures 36A, 36B, 36C, 36D, 36E:
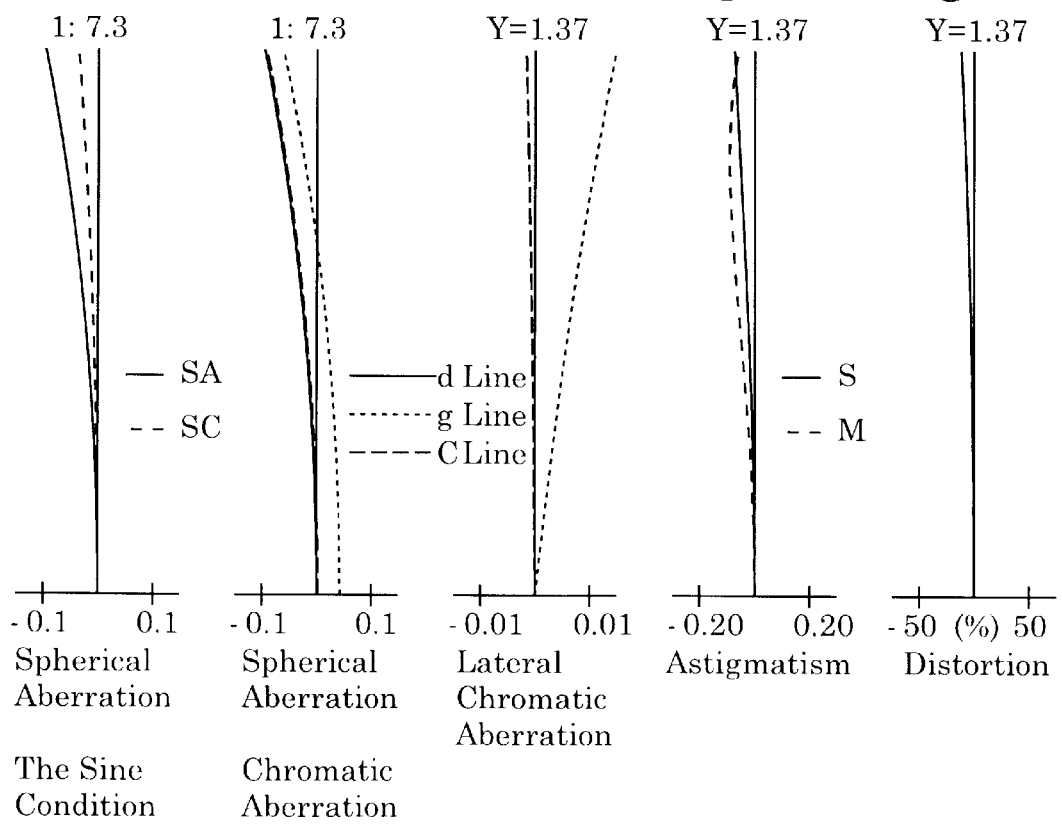
FIGS. 36A, 36B, 36C, 36D and 36E show aberrations occurred in the lens arrangement of FIG. 35.
Figure 37:
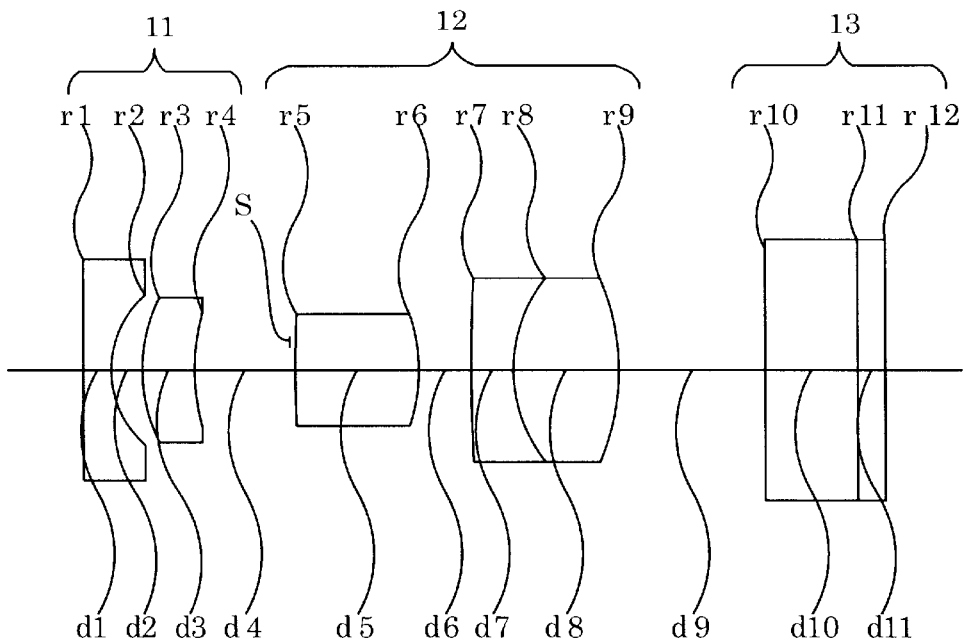
FIG. 37 shows a lens arrangement of an endoscope objective optical system at the short focal length extremity, according to a tenth embodiment of the present invention.

FIGS. 33 through 36E show the endoscope objective optical system, according to the ninth embodiment. FIG. 34 shows the lens arrangement of the endoscope objective optical system at the short focal length extremity. FIGS. 34A through 34E show aberrations occurred in the lens arrangement of FIG. 33. FIG. 35 shows the lens arrangement of the endoscope objective optical system at the long focal length extremity. FIGS. 36A through 36E show aberrations occurred in the lens arrangement of FIG. 35. Table 9 shows the numerical values of the ninth embodiment. The basic lens arrangement of the ninth embodiment is the same as the third embodiment.

TABLE 9

FE = 5.7–7.3
f = 1.30–1.89
ODIS_w = −10
ODIS_t = −2.5
$f_B$ = 0.05–0.05
W = 70.2–36.4
m = −0.12—−0.66
m2T = −1.97
m2W = −1.02

| Surface No. | r | d | Nd | ν |
|---|---|---|---|---|
| 1 | ∞ | 0.30 | 1.88300 | 40.8 |
| 2 | 1.126 | 0.34 | — | — |
| 3* | 2.637 | 0.69 | 1.84666 | 23.8 |
| 4 | 3.434 | 1.10–0.40 | — | — |
| Diaphragm | ∞ | 0.06 | — | — |
| 5 | 13.910 | 1.08 | 1.88300 | 40.8 |
| 6 | −1.922 | 0.94 | — | — |
| 7 | 17.193 | 0.30 | 1.84666 | 23.8 |
| 8 | 1.558 | 1.21 | 1.58913 | 61.2 |
| 9 | −2.494 | 1.34–3.33 | — | — |
| 10 | ∞ | 1.00 | 1.51633 | 64.1 |
| 11 | ∞ | 0.30 | 1.53113 | 62.4 |
| 12 | ∞ | 0.05–0.05 | — | — |

*designates the aspherical surface which is rotationally symmetrical with respect to the optical axis.
Aspherical surface data (the aspherical surface TABLE 9-continued coefficients not indicated are zero (0.00)):

| Surf. No. | K | A4 | A6 | A8 |
|---|---|---|---|---|
| 3 | 0.00 | −0.94371 × $10^{-2}$ | 0.38983 × $10^{-1}$ | −0.62641 × $10^{-2}$ |

[Embodiment 10]

Figures 38A, 38B, 38C, 38D, 38E:
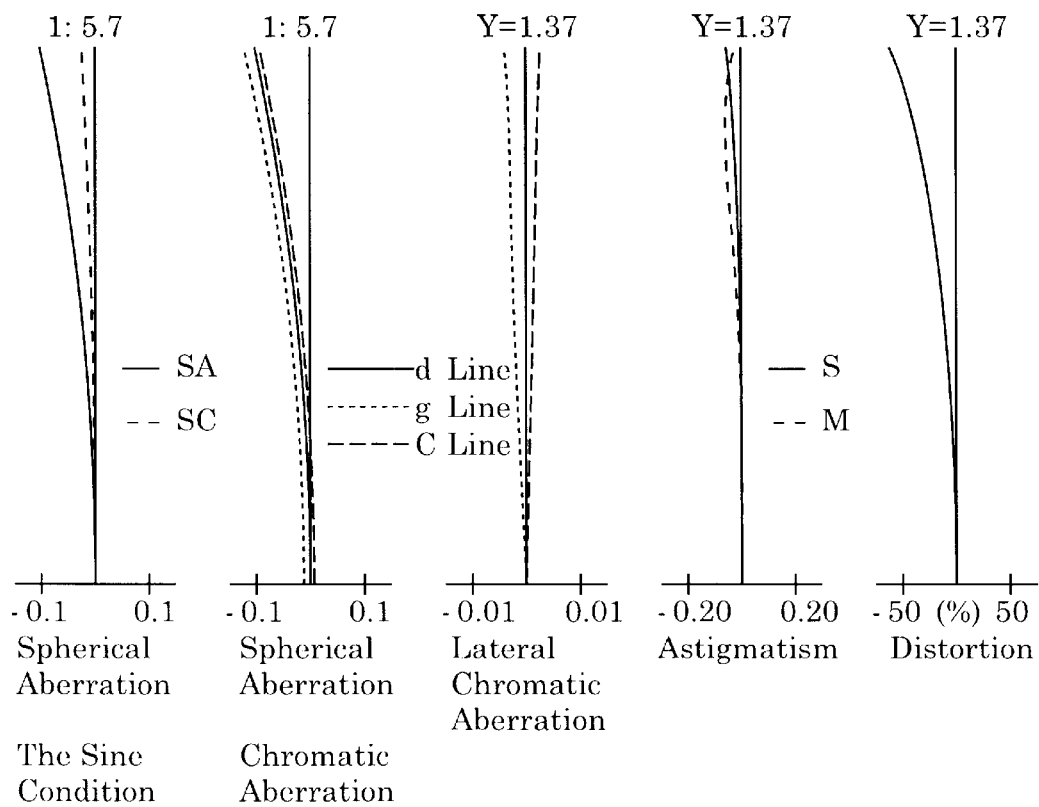
FIGS. 38A, 38B, 38C, 38D and 38E show aberrations occurred in the lens arrangement of FIG. 37.
Figure 39:
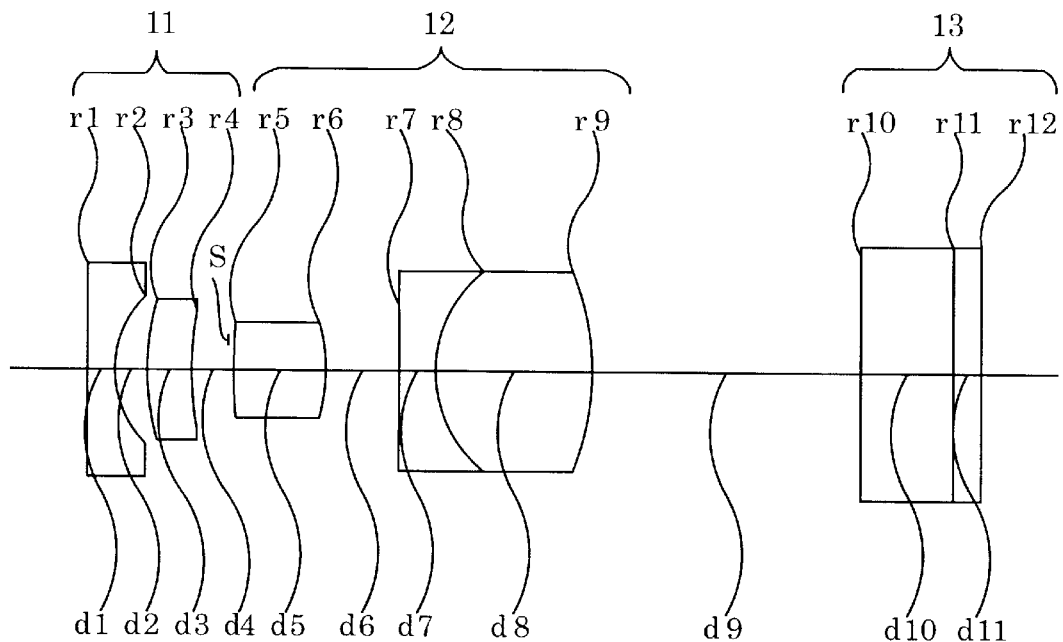
FIG. 39 shows a lens arrangement of the endoscope objective optical system at the long focal length extremity, according to the tenth embodiment of the present invention.
Figures 40A, 40B, 40C, 40D, 40E:
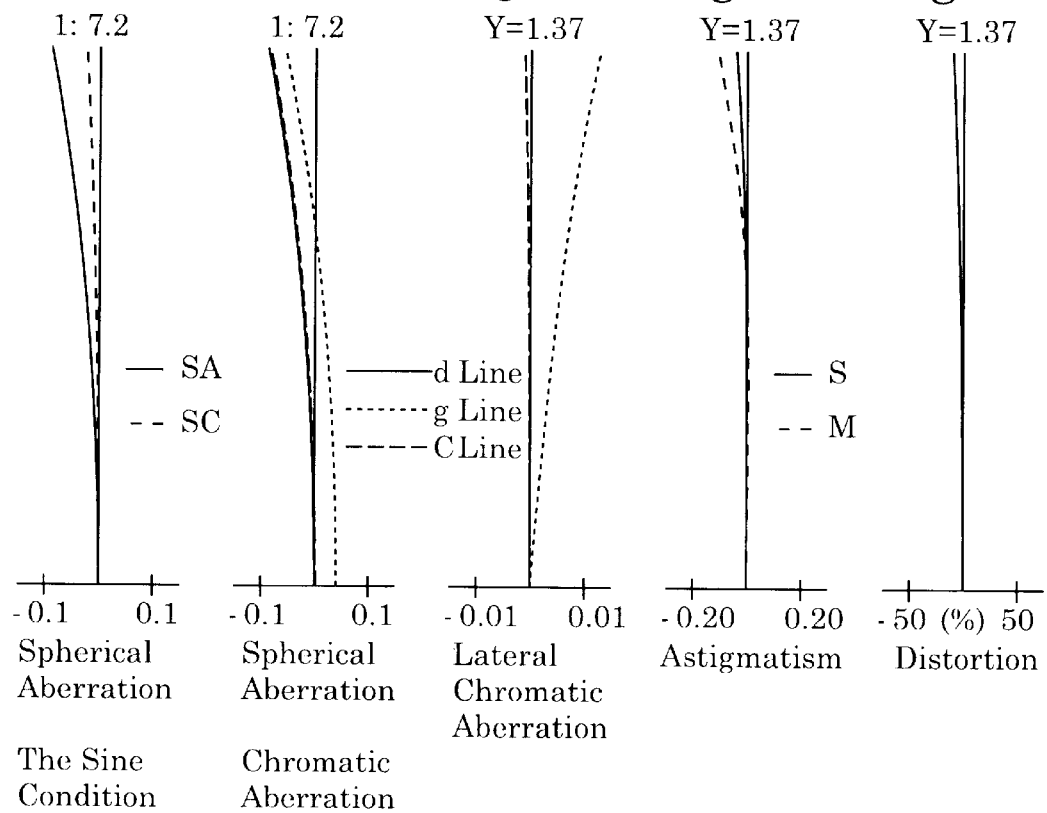
FIGS. 40A, 40B, 40C, 40D and 40E show aberrations occurred in the lens arrangement of FIG. 39.

FIGS. 37 through 40E show the endoscope objective optical system, according to the tenth embodiment. FIG. 38 shows the lens arrangement of the endoscope objective optical system at the short focal length extremity. FIGS. 38A through 38E show aberrations occurred in the lens arrangement of FIG. 37. FIG. 39 shows the lens arrangement of the endoscope objective optical system at the long focal length extremity. FIGS. 40A through 40E show aberrations occurred in the lens arrangement of FIG. 39. Table 10 shows the numerical values of the tenth embodiment. The basic lens arrangement of the tenth embodiment is the same as the third embodiment.

TABLE 10

FE = 5.7–7.2
f = 1.33–1.88
ODIS_w = −10
ODIS_t = −2.5
$f_B$ = 0.05–0.05
W = 70.3–38.2
m = −0.12—−0.66
m2T = −1.94
m2W = −1.02

| Surface No. | r | d | Nd | ν |
|---|---|---|---|---|
| 1 | ∞ | 0.30 | 1.88300 | 40.8 |
| 2 | 1.091 | 0.34 | — | — |
| 3 | 1.751 | 0.57 | 1.84666 | 23.8 |
| 4* | 2.192 | 1.03–0.40 | — | — |
| Diaphragm | ∞ | 0.06 | — | — |
| 5 | 13.767 | 1.33 | 1.88300 | 40.8 |
| 6 | −1.917 | 0.57 | — | — |
| 7 | 20.953 | 0.45 | 1.84666 | 23.8 |
| 8 | 1.609 | 1.15 | 1.58913 | 61.2 |
| 9 | −2.573 | 1.60–3.46 | — | — |
| 10 | ∞ | 1.00 | 1.51633 | 64.1 |
| 11 | ∞ | 0.30 | 1.53113 | 62.4 |
| 12 | ∞ | 0.05–0.05 | — | — |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 4 | 0.00 | −0.24204 × $10^{-2}$ | −0.11663 × 1 | 0.71918 × $10^{-1}$ |

[Embodiment 11]

Figure 41:
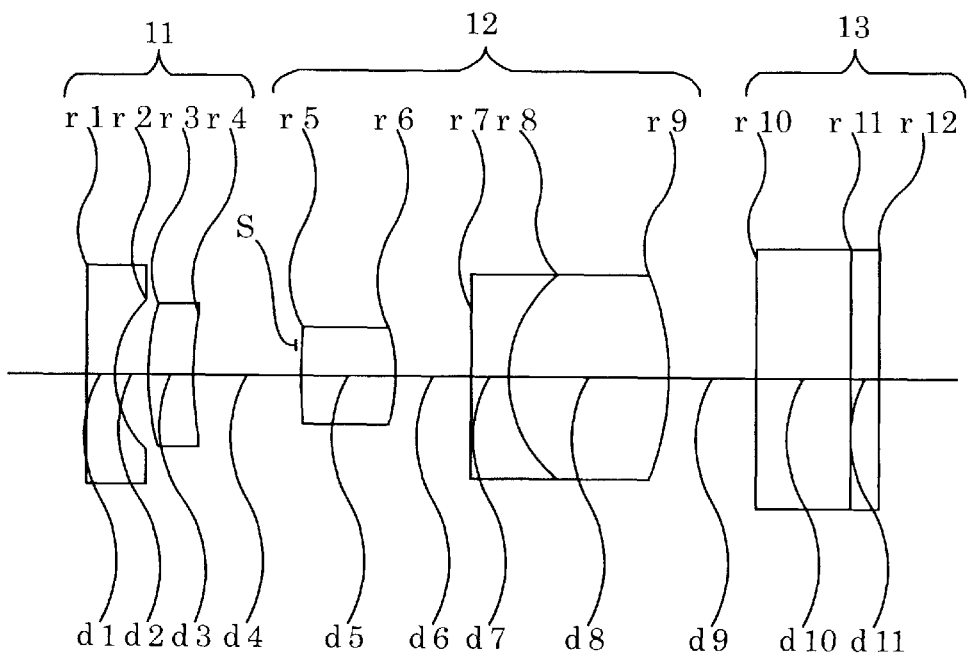
FIG. 41 shows a lens arrangement of an endoscope objective optical system at the short focal length extremity, according to an eleventh embodiment of the present invention.
Figures 42A, 42B, 42C, 42D, 42E:
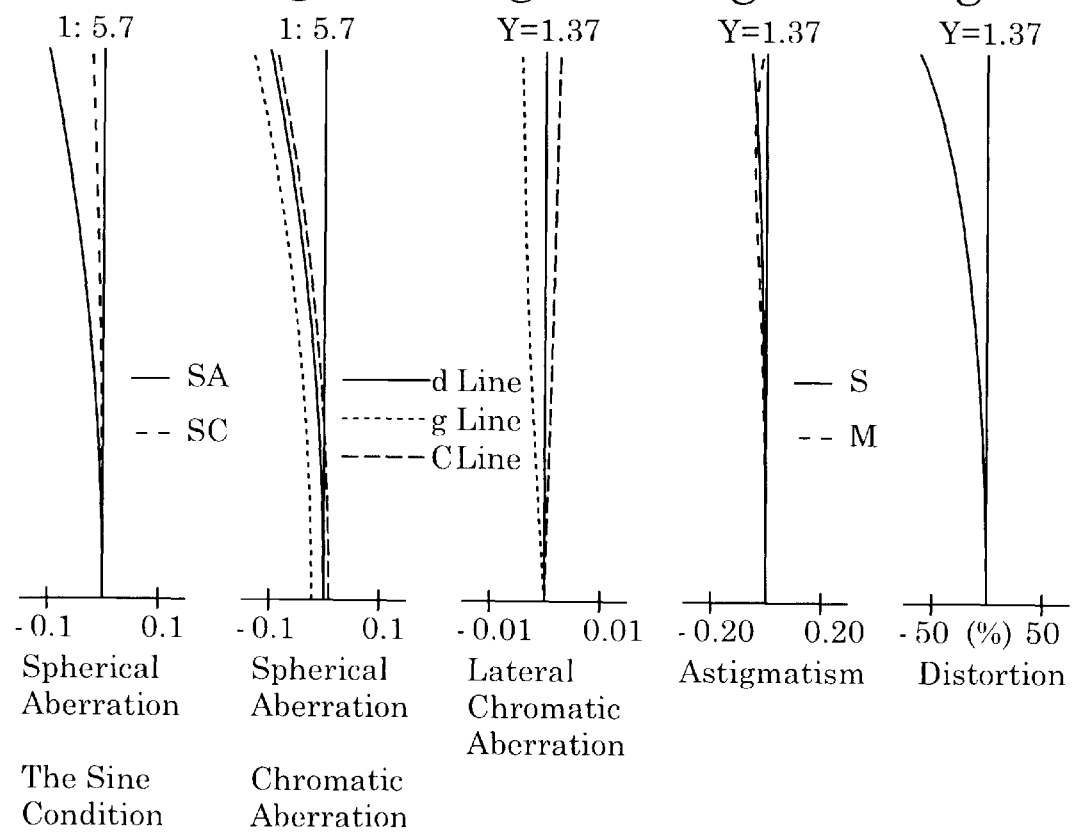
FIGS. 42A, 42B, 42C, 42D and 42E show aberrations occurred in the lens arrangement of FIG. 41.
Figure 43:
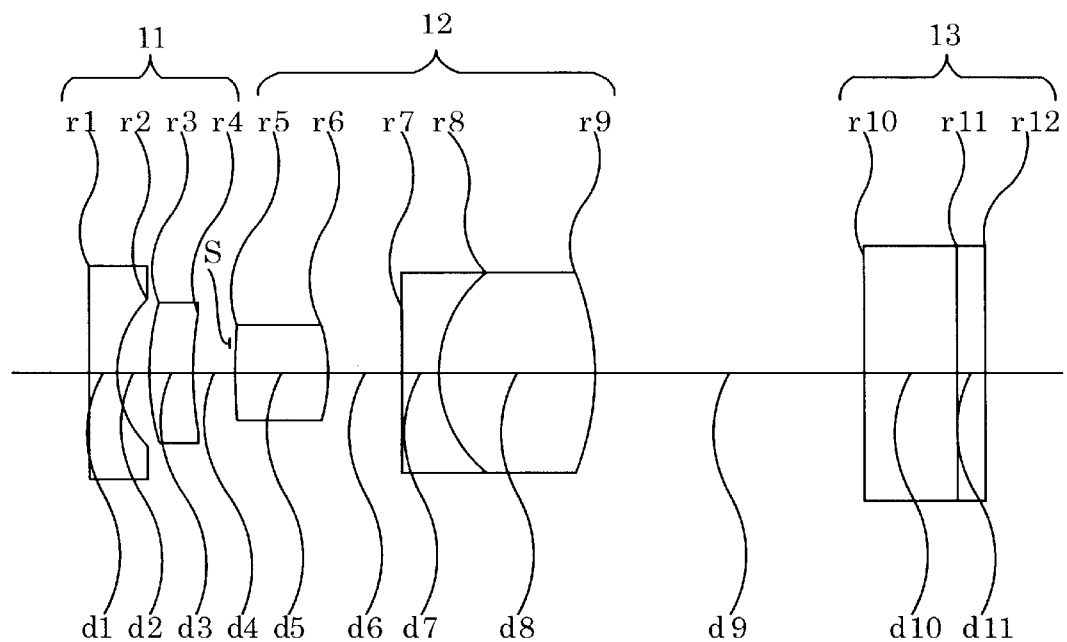
FIG. 43 shows a lens arrangement of the endoscope objective optical system at the long focal length extremity, according to the eleventh embodiment of the present invention.
Figures 44A, 44B, 44C, 44D, 44E:
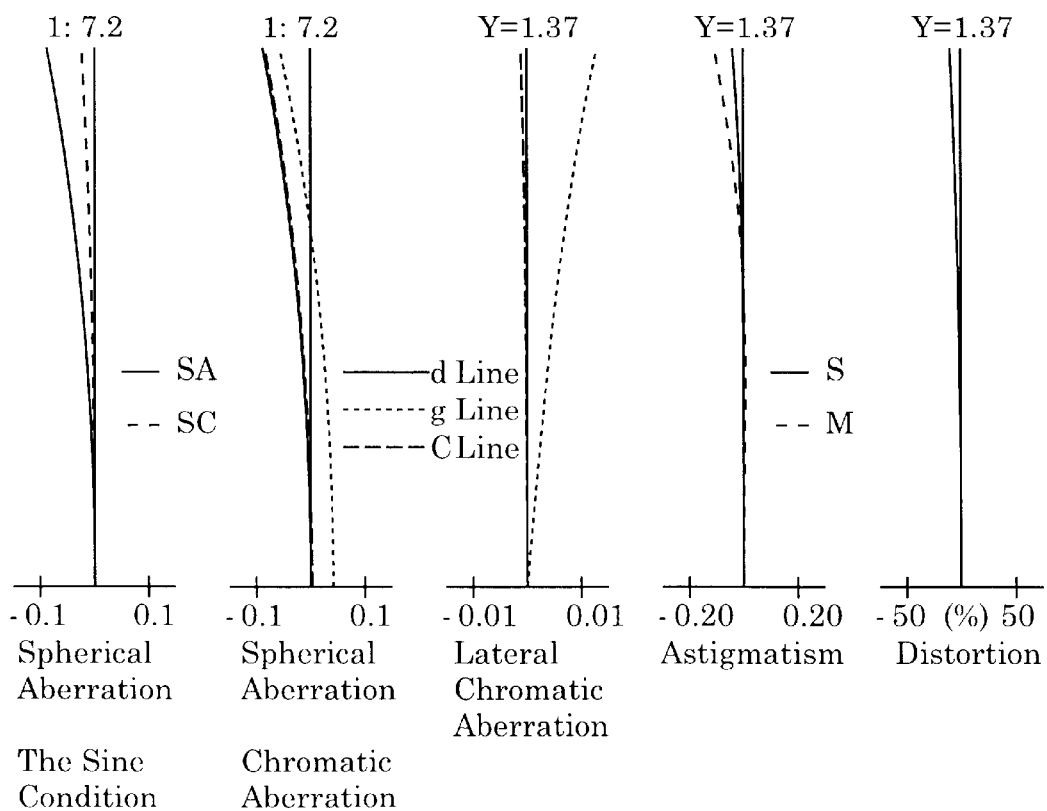

FIGS. 41 through 44E show the endoscope objective optical system, according to the eleventh embodiment. FIG. 41 shows the lens arrangement of the endoscope objective optical system at the short focal length extremity. FIGS. 42A through 42E show aberrations occurred in the lens arrangement of FIG. 41. FIG. 43 shows the lens arrangement of the endoscope objective optical system at the long focal length extremity. FIGS. 44A through 44E show aberrations occurred in the lens arrangement of FIG. 43. Table 11 shows the numerical values of the eleventh embodiment. The basic lens arrangement of the eleventh embodiment is the same as the third embodiment.

TABLE 11

FE = 5.7–7.2
f = 1.30–1.88
ODIS_w = −10
ODIS_t = −2.5
$f_B$ = 0.05—0.05
W = 70.4–36.2
m = −0.12—−0.66
m2T = −1.96
m2W = −1.02

| Surface No. | r | d | Nd | ν |
|---|---|---|---|---|
| 1 | ∞ | 0.30 | 1.88300 | 40.8 |
| 2 | 1.128 | 0.35 | — | — |
| 3 | 2.840 | 0.47 | 1.84666 | 23.8 |
| 4 | 3.600 | 1.09–0.40 | — | — |
| Diaphragm | ∞ | 0.06 | — | — |
| 5 | 7.514 | 1.00 | 1.88300 | 40.8 |
| 6 | −1.859 | 0.80 | — | — |
| 7 | −80.422 | 0.40 | 1.84666 | 23.8 |
| 8 | 1.403 | 1.69 | 1.66910 | 55.4 |
| 9* | −2.782 | 0.93–2.90 | — | — |
| 10 | ∞ | 1.00 | 1.51633 | 64.1 |
| 11 | ∞ | 0.30 | 1.53113 | 62.4 |
| 12 | ∞ | 0.05—0.05 | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 4 | 0.00 | $0.10542 \times 10^{-1}$ | $-0.18897 \times 10^{-2}$ | — |

The numerical values of each condition of each embodiment are shown in Table 12.

TABLE 12

| | Cond. (1) | | Cond. (2) | Cond. (3) | Cond. (4) | Cond. (5) | Cond. (6) |
|---|---|---|---|---|---|---|---|
| | $m_{2T}$ | $m_{2W}$ | | | | | |
| Embod. (1) | −2.02 | −1.06 | −1.01 | — | — | −7.81 | −1.95 |
| Embod. (2) | −1.93 | −1.05 | −1.03 | — | — | −7.52 | −1.88 |
| Embod. (3) | −2.13 | −1.14 | −0.94 | 1.88300 | 20.70 | −7.75 | −1.94 |
| Embod. (4) | −2.12 | −1.12 | −0.96 | 1.88300 | 21.10 | −7.69 | −1.92 |
| Embod. (5) | −1.87 | −1.04 | −1.04 | — | — | −7.14 | −1.79 |
| Embod. (6) | −1.65 | −1.04 | −1.09 | — | — | −6.10 | −1.52 |
| Embod. (7) | −1.91 | −1.02 | −1.06 | — | — | −7.52 | −1.88 |
| Embod. (8) | −1.99 | −1.04 | −1.03 | — | — | −7.81 | −1.95 |
| Embod. (9) | −1.97 | −1.02 | −1.06 | 1.88300 | 7.38 | −7.69 | −1.92 |
| Embod. (10) | −1.94 | −1.02 | −1.06 | 1.88300 | 4.87 | −7.52 | −1.88 |
| Embod. (11) | −1.96 | −1.02 | −1.06 | 1.88300 | 9.51 | −7.69 | −1.92 |

As can be understood from Table 12, each embodiment (1) through (11) satisfies each condition (1) through (4). Furthermore, as can be understood from the aberration diagrams, the various aberrations are adequately corrected. Note that the values of $m_{2T}$ and $m_{2W}$ correspond to each of the two numerical values m2 indicated in each of Tables 1 through 11.

According to the above description, an endoscope objective optical system, which (i) can enable both observing at a wider angle of field, (ii) enlarged observing at a higher zoom ratio, (iii) can maintain the overall length of the objective optical system shorter, and (iv) can maintain the diameter thereof smaller, can be obtained.

What is claimed is:

1. An endoscope objective optical system comprising a negative first lens group, a positive second lens group, and an imaging device, in this order from an object,
   wherein a focal length of the entire endoscope objective optical system is changed by moving said positive second lens group in the optical axis direction, and
   wherein said endoscope objective optical system satisfies the following condition:

$m_{2T} < m_{2W} < -1$ wherein
   $m_{2T}$ designates the lateral magnification of said second lens group at the long focal length extremity, and
   $m_{2W}$ designates the lateral magnification of said second lens group at the short focal length extremity.

2. An endoscope objective optical system according to claim 1, satisfying the following condition:

$-1.15 < f_1/f_W < -0.5$ wherein
   $f_1$ designates the focal length of said first lens group, and
   $f_W$ designates the focal length of said entire endoscope objective optical system at the short focal length extremity.

3. An endoscope objective optical system according to claim 1, wherein said negative first lens group is fixed to the front-end of an endoscope body-insertion portion;
   wherein said positive second lens group and said imaging device are supported in said endoscope body-insertion portion in a manner that said positive second lens group and said imaging device are moveable in the optical axis direction; and
   wherein said imaging device is arranged to move along the optical axis in order to vary the magnification of said endoscope objective optical system, and vary a distance to an object in an in-focus state.

4. An endoscope objective optical system according to claim 1, wherein said negative first lens group consists of a negative lens element.

5. An endoscope objective optical system according to claim 1, wherein said negative first lens group comprises a negative lens element and a positive lens element, in this order from said object,
   wherein said negative first lens group satisfies the following conditions:

$n > 1.7$ $3.5 < f_{1+}/f_W < 25$ wherein
   $n\_$ designates the refractive index of said negative lens element in said negative first lens group,
   $f_{1+}$ designates the focal length of said positive lens element in said negative first lens group, and
   $f_W$ designates the focal length of said entire endoscope objective optical system at the short focal length extremity.

6. An endoscope objective optical system according to claim 5, wherein said positive lens element has at least one aspherical surface which is formed so that the lens thickness of said positive lens element having said aspherical surface is smaller than that of a positive lens element having a spherical surface with the same paraxial radius of curvature as the paraxial radius of curvature of said aspherical surface at the same height from the optical axis, and the difference between the thickness of said positive lens element having said aspherical surface and said positive lens element having said spherical surface increases as the height from the optical axis increases.

7. An endoscope objective optical system according to claim 1, wherein said negative first lens group comprises a negative lens element having at least one aspherical surface which is formed so that the lens thickness of said negative lens element having said aspherical surface is larger than that of a negative lens element having a spherical surface with the same paraxial radius of curvature as the paraxial radius of curvature of said aspherical surface at the same height from the optical axis, and the difference between the thickness of said negative lens element having said aspherical surface and said negative lens element having said spherical surface increases as the height from the optical axis increases.

8. An endoscope objective optical system according to claim 1, wherein said positive second lens group comprises a positive lens element having at least one aspherical surface which is formed so that the lens thickness of said positive lens element having said aspherical surface is larger than that of a positive lens element having a spherical surface with the same paraxial radius of curvature as the paraxial radius of curvature of said aspherical surface at the same height from the optical axis, and the difference between the thickness of said positive lens element having said aspherical surface and said positive lens element having said spherical surface increases as the height from the optical axis increases.

9. An endoscope objective optical system according to claim 1, satisfying the following conditions:

$$-9.2 < ODIS\_w/fw < -4.7$$

$$-2.2 < ODIS\_t/fw < -0.8$$

wherein
    $ODIS\_w$ designates the object distance at the short focal length extremity;
    $ODIS\_t$ designates the object distance at the long focal length extremity; and
    $fw$ designates the focal length of the entire endoscope objective optical system at the short focal length extremity.

* * * * *